(12) United States Patent
Uejima

(10) Patent No.: US 7,770,693 B2
(45) Date of Patent: Aug. 10, 2010

(54) MAT FOR ACOUSTIC APPARATUS

(76) Inventor: Kazuo Uejima, 26-5, Kishibekita 5-chome, Suita-shi, Osaka (JP) 564-0001

( * ) Notice: Subject to any disclaimer, the term of this patent is extended or adjusted under 35 U.S.C. 154(b) by 278 days.

(21) Appl. No.: 11/662,316

(22) PCT Filed: Apr. 5, 2005

(86) PCT No.: PCT/JP2005/006635

§ 371 (c)(1),
(2), (4) Date: Mar. 7, 2007

(87) PCT Pub. No.: WO2006/030555

PCT Pub. Date: Mar. 23, 2006

(65) Prior Publication Data

US 2007/0227816 A1 Oct. 4, 2007

(30) Foreign Application Priority Data

Sep. 15, 2004 (JP) ............................. 2004-268656

(51) Int. Cl.
*E04B 1/84* (2006.01)

(52) U.S. Cl. ..................... 181/294; 181/290; 181/284; 181/207

(58) Field of Classification Search ................. 181/294, 181/207, 208, 209, 284, 290; 428/116, 117, 428/118, 119, 120
See application file for complete search history.

(56) References Cited

U.S. PATENT DOCUMENTS

| | | | | |
|---|---|---|---|---|
| 2,914,275 A * | 11/1959 | Mitchell | ............. | 248/633 |
| 3,026,224 A * | 3/1962 | Rogers, Jr. | ............. | 428/167 |
| 3,330,377 A * | 7/1967 | Reed | ............. | 181/294 |
| 3,472,305 A * | 10/1969 | Lefes | ............. | 160/236 |
| 4,272,572 A * | 6/1981 | Netherly | ............. | 428/35.5 |
| 4,283,465 A * | 8/1981 | Morimoto et al. | ............. | 428/566 |
| 4,346,782 A * | 8/1982 | Bohm | ............. | 181/207 |
| 4,353,433 A * | 10/1982 | Mohrenstein-Ertel et al. | ............. | 181/207 |
| 4,357,393 A * | 11/1982 | Tsuda et al. | ............. | 428/547 |
| 4,493,471 A * | 1/1985 | McInnis | ............. | 248/580 |
| 4,667,417 A * | 5/1987 | Graser et al. | ............. | 34/337 |
| 4,776,573 A * | 10/1988 | Wolf et al. | ............. | 267/140.11 |
| 4,923,034 A * | 5/1990 | Okuzawa et al. | ............. | 181/207 |
| 4,940,113 A * | 7/1990 | L'Heureux | ............. | 181/296 |

(Continued)

FOREIGN PATENT DOCUMENTS

EP 0 078 649 5/1983

(Continued)

*Primary Examiner*—Jeffrey Donels
*Assistant Examiner*—Forrest M Phillips
(74) *Attorney, Agent, or Firm*—Jordan and Hamburg LLP

(57) ABSTRACT

An acoustic equipment mat is formed by arranging plural grain pieces of inexpensive silica gel in a single layer. When the mat is disposed under an acoustic equipment, the grain pieces have their upper ends in point contact with a bottom or the like of the acoustic equipment and have their lower ends in point contact with the underlying floor or the like. Hence, the mat 1*a* is notably reduced in the area of contact with the acoustic equipment or the like, so as to reduce the reflection of vibrations. In addition, the mat 1*a* is capable of extremely quickly dissipating, in the atmosphere, the vibrations directly propagated to the upper-end side thereof and the vibrations indirectly propagated thereto as reflected by the lower-end side thereof.

15 Claims, 28 Drawing Sheets

U.S. PATENT DOCUMENTS

| | | | | |
|---|---|---|---|---|
| 5,044,030 | A * | 9/1991 | Balaton | 5/710 |
| 5,108,833 | A * | 4/1992 | Noguchi et al. | 428/310.5 |
| 5,110,660 | A * | 5/1992 | Wolf et al. | 428/178 |
| 5,290,973 | A * | 3/1994 | Kwoh | 181/199 |
| 5,298,693 | A * | 3/1994 | Heijn | 181/199 |
| H001317 | H * | 6/1994 | Ng | 181/207 |
| 5,484,970 | A * | 1/1996 | Suzuki et al. | 181/294 |
| 5,656,195 | A * | 8/1997 | Mielke et al. | 252/62 |
| 5,706,249 | A * | 1/1998 | Cushman | 367/1 |
| 5,793,003 | A * | 8/1998 | Malhotra | 181/207 |
| 5,855,353 | A | 1/1999 | Shaffer et al. | |
| 6,007,890 | A * | 12/1999 | DeBlander | 428/72 |
| 6,053,275 | A * | 4/2000 | Leonetti et al. | 181/200 |
| 6,598,358 | B1 * | 7/2003 | Schwertfeger et al. | 52/145 |
| 6,783,835 | B2 * | 8/2004 | McCollough et al. | 428/131 |
| 6,887,563 | B2 * | 5/2005 | Frank et al. | 428/312.6 |
| 7,263,028 | B2 * | 8/2007 | Thomas et al. | 367/1 |
| D584,911 | S * | 1/2009 | Hisey et al. | D6/601 |
| 2003/0050387 | A1 | 3/2003 | Fujisawa | |
| 2003/0112735 | A1 | 6/2003 | Itakura | |
| 2005/0051381 | A1 * | 3/2005 | Imai | 181/207 |
| 2006/0037815 | A1 * | 2/2006 | Schabel | 181/290 |
| 2007/0154698 | A1 * | 7/2007 | Stepanian | 428/294.7 |
| 2007/0227814 | A1 * | 10/2007 | Schabel | 181/288 |
| 2008/0029337 | A1 * | 2/2008 | Alston | 181/294 |
| 2008/0108755 | A1 * | 5/2008 | Heiliger et al. | 525/191 |
| 2009/0022967 | A1 * | 1/2009 | Inenaga | 428/214 |

FOREIGN PATENT DOCUMENTS

| | | |
|---|---|---|
| JP | 58-84242 | 5/1983 |
| JP | 2-54700 | 2/1990 |
| JP | 6-202668 | 7/1994 |
| JP | 7-212880 | 8/1995 |
| JP | 8-163468 | 6/1996 |
| JP | 2000-138988 | 5/2000 |
| JP | 2001-279620 | 10/2001 |
| JP | 2003-025310 | 1/2003 |
| KR | 1999-0044531 | 6/1999 |

* cited by examiner

1a MAT FOR USE WITH ACOUSTIC EQUIPMENT
2a GRAIN PIECE
3 BONDING MEDIUM

FIG. 42 SINGLE-LAYERED-MAT EQUIPPED STATE (35cm SPEAKER, 5000Hz)

MAT FOR ACOUSTIC APPARATUS

TECHNICAL FIELD

The present invention relates to a mat for use with acoustic equipment, which is disposed under an acoustic equipment such as a speaker or amplifier so as to improve the acoustic characteristics of the equipment.

BACKGROUND ART

In the field of a so-called audio system, the recent advent of digital acoustic equipment such as CD players and MD players has made it possible to appreciate music and the like recorded on CDs and MDs by reproducing high-speed signals having a broad dynamic range.

In this case, the influence of vibrations of casings, circuit components and the like of the acoustic equipment, such as amplifiers and speakers, of the audio system is an important matter if these pieces of music are to be reproduced with the finest and richest possible musical expression.

This problem is encountered not only in music appreciation using a full-scale audio system but also in music appreciation using a compact stereo system or a radio-cassette player.

In addition, the vibrations of the acoustic equipment also have an adverse effect on the quality of sound outputted from electronic music instruments and such or recorded on a CD or MD at a recording site.

It has been a conventional practice to use a vibration insulator, such as formed of rubber or lead, for absorbing vibrations (reducing noises) in order that the influence of the vibrations of the acoustic equipment may be reduced as much as possible during the musical reproduction or recording (see, for example, Patent Document 1).

Patent Document 1: Japanese Unexamined Patent Publication No. 2000-138988 (Paragraphs [0008], [0019]; FIG. 1, FIG. 3).

DISCLOSURE OF THE INVENTION

Problems to Be Solved by the Invention

The vibration absorption using the above vibration insulator of rubber or lead has the following problem. An acoustic absorption performance of the vibration insulator cannot fully follow music or the like represented by the high-speed signals having the broad dynamic range. Hence, the vibration insulator fails to offer an adequate effect to absorb/reduce the vibrations occurring in the acoustic equipment such as the amplifiers and speakers during the sound reproduction or recording.

It is well known in the field of the acoustic equipment that aluminum has a high vibration (sound) propagation speed and is capable of quickly dissipating sound waves or vibrations in the atmosphere.

It is therefore contemplated to employ an aluminum insulator or the like in place of the above rubber or lead vibration insulator, so as to quickly dissipate the vibrations of the acoustic equipment in the atmosphere rather than to absorb the vibrations (noises). Thus, an adequate vibration reduction effect may be obtained with respect to music represented by the high-speed signals having the broad dynamic range.

However, the aluminum insulator or the like is a thick plate-like material formed by a metal working process including casting, machining and the like. Naturally, the aluminum insulator cannot be easily formed at low costs. In addition, the aluminum insulator is so heavy and bulky as to be cumbersome in use. As disposed under the acoustic equipment, the aluminum insulator has its flat upper surface in contact with a bottom of the acoustic equipment and the like, and has its overall bottom surface in contact with a rack of the acoustic equipment, a floor surface or the like. Hence, the aluminum insulator has a large area of contact with the acoustic equipment. In actual fact, the aluminum insulator does not so quickly dissipate the vibrations of the acoustic equipment, as described below.

As illustrated by FIG. 44 explanatory of the vibration dissipation, the acoustic equipment represents a vibration source A and the underlying aluminum insulator represents a vibration insulating material B. As indicated by the arrows, the vibrations produced at the vibration source A are propagated to the vibration insulation material B and dissipated in the atmosphere (space) C via a peripheral surface of the vibration insulation material. However, a substantial quantity of the vibrations is reflected by a vibration incidence surface Ba (upper surface in contact with the vibration source A) of the vibration insulation material B and by a vibration exit surface Bb (lower surface) thereof, which is on the opposite side and is in contact with a floor D or the like. What is more, the aluminum vibration insulation material B is normally formed in a great thickness exceeding several centimeters in order to bear the load of the vibration source A. As a result, it takes much time before the vibrations propagated from the vibration source A to the vibration incidence surface of the vibration insulation material B and the vibrations reflected back to the vibration insulation material B by the opposite vibration exit surface are dissipated in the atmosphere via the vibration insulation material B. In actual fact, the vibrations from the vibration source A are not dissipated quickly.

Therefore, the use of the aluminum insulator or the like is not effective to reduce the vibrations adequately.

In this connection, there is a demand for a vibration insulation material which is easy to form at low costs and has a light-weight, compact constitution, which is adapted for quick and adequate reduction of the vibrations produced at the acoustic equipment such as the amplifier or speaker during the reproduction or recording of music or the like, and which improves the acoustic characteristic of the acoustic equipment outputting music or the like represented by the high-speed signals having the broad dynamic range.

To meet the above demand, the invention has an object to provide a novel mat for use with acoustic equipment which is easy to form at low costs and which is implemented in a light-weight, compact constitution offering a great effect to improve the acoustic characteristic of an acoustic equipment such as an amplifier or speaker operated for sound reproduction or sound recording by dissipating and reducing the vibrations of the acoustic equipment much more quickly and adequately, as compared with the case where the conventional rubber or lead vibration insulator or the aluminum insulator is used.

Means for Solving the Problem

Acoustic equipment mats according to the invention for solving the above problem are collectively described as below.

According to the invention for solving the above problem, a mat for use with acoustic equipment comprises a plurality of silica-gel grain pieces arranged in a single layer (first aspect).

According to another aspect of the invention, a mat for use with acoustic equipment is characterized in that the grain pieces in adjoining relation are bonded to each other at their peripheries (second aspect).

According to another aspect of the invention, a mat for use with acoustic equipment is characterized in that the grain pieces are arranged in a single layer as sandwiched between a flexible mesh substrate in a mesh-sheet form and a flexible thin-film adhesive substrate attached to the mesh substrate in a manner that each grain piece is located in each of the meshes of the mesh substrate and projected from the adhesive substrate (third aspect) and that the mesh substrate comprises a mesh tape and the adhesive substrate comprises an adhesive bandage (fourth aspect).

According to another aspect of the invention, a mat for use with acoustic equipment further comprises a case member formed of a flexible pile weave fabric and is characterized in that the grain pieces are arranged in a single layer and are each located in each of the meshes of a meshed ground structure of the pile weave fabric thereby locked in the case member by means of each pile portion (fifth aspect) and that the case member comprises a pile weave towel cloth (sixth aspect).

According to the invention, a mat for use with acoustic equipment comprises a plurality of silica-gel grain pieces arranged in a single layer and attached to each of the two sides of a flexible thin-film support substrate (seventh aspect) and is characterized in that the support substrate comprises a double-sided tape (Claim 8) and that the double-sided tape has a mesh configuration (ninth aspect).

According to another aspect of the invention, a mat for use with acoustic equipment is characterized in that the silica-gel grain pieces are coated with a carbon coat (tenth aspect).

According to another aspect of the invention, a mat for use with acoustic equipment is characterized in that the grain pieces substantially have spherical shapes having diameters in the range of 1 mm to 10 mm (eleventh aspect).

According to another aspect of the invention, a mat for use with acoustic equipment is characterized in that the grain pieces comprise B-type silica gel (twelfth aspect).

It is noted that the term "bond", as used herein, includes "adhere".

EFFECTS OF THE INVENTION

According to the first aspect of the invention, the acoustic equipment mat is light in weight and is easily formed at low costs by arranging the inexpensive grain pieces of silica gel in a single layer. The formation of the mat does not require a costly precision processing such as metal working. Furthermore, the silica gel is harder than aluminum so that the mat having quite a small thickness substantially equal to a grain size of the silica-gel grain pieces may be disposed under a heavy acoustic equipment such as a speaker. The mat does not take up much space and is not cumbersome in use.

When the acoustic equipment mat having a single-layer structure of the grain pieces is disposed under the acoustic equipment such as an amplifier, speaker or the like, the individual grain pieces have their upper ends in point contact with the bottom of the acoustic equipment or the like and have their lower ends in point contact with the underlying floor or the like, so that the mat has quite a small area of contact with the acoustic equipment or the like. When the vibrations occurring at the casing and the like of the acoustic equipment are propagated to the mat, the quantity of vibrations reflected by a vibration incidence side (the upper ends of the grain pieces) and by a vibration exit side opposite therefrom (the lower ends of the grain pieces) is small. Hence, the mat notably reduces sound-quality degradation caused by the reflected vibrations or the like, as compared with the case where the aluminum insulator or the like is used.

Furthermore, this mat has not only a small thickness but also a great surface area because the mat is an assembly of plural grain pieces arranged in a layer. In addition, silicon dioxide as the major component of silica gel propagates the vibrations, such as sound waves, nearly as fast as aluminum. Therefore, the vibrations directly propagated from the acoustic equipment to the mat and the vibrations indirectly propagated to the mat as reflected from the lower-end side thereof are quite quickly dissipated in the atmosphere via the surfaces of the grain pieces.

Accordingly, the mat may be easily formed at low costs by using the silica-gel grain pieces, which negate the need for the costly precision processing such as metal working. Thus is provided a novel mat for use with acoustic equipment which is implemented in the light-weight, thin and compact configuration, which is capable of reducing the vibrations from the acoustic equipment such as an amplifier or speaker by dissipating the vibrations much more quickly and adequately as compared with the case where the aluminum insulator or the like is used, and which offers a great effect to improve the acoustic characteristic of the acoustic equipment as contributing to finely and richly expressive reproduction of the music sound or the like represented by the high-speed signals having the broad dynamic range.

According to the second aspect of the invention, the single layer structure of the grain pieces may be formed by mutually bonding the silica-gel grain pieces at their peripheries.

According to the third aspect of the invention, the flexible mesh substrate in a mesh-sheet form and the flexible thin-film adhesive substrate are bonded to each other as sandwiching the silica-gel grain pieces therebetween. In this case, the single-layer structure of the grain pieces may be formed in a manner that the respective meshes of the mesh substrate regularly locate the respective grain pieces for preventing the grain pieces from making mutual contact, that the grain pieces are uniformized in size to some extent so as to prevent the reproduced sounds from making unclear harmony, that the degradation of the grain pieces due to mutual contact is minimized, and that the reproduced sounds are prevented from making unclear harmony due to the size variations of the grain pieces. What is more, the laminate of these substrates is thin and flexible, thus constituting a thin, flexible mat.

The grain pieces have their upper and lower ends exposed from the meshes of the mesh substrate and from the adhesive substrate so that these substrates may have the least possible influence on the vibration dissipation.

The mat is formed by utilizing the adhesivity of the adhesive substrate for bonding together these substrates. Therefore, the mat may be formed (fabricated) in a simple and easy manner without facing any restriction such as a curing time of a bonding agent in a case where the bonding agent is used for bonding together the grain pieces. The mat provides practical utility.

Accordingly, the single layer structure of silica gel may be easily formed to provide the novel acoustic equipment mat highly effective to improve the acoustic characteristic of the acoustic equipment.

According to the fourth aspect of the invention, the mesh substrate is formed of the mesh tape and the adhesive substrate is formed of the adhesive bandage. Therefore, the mat for use with acoustic equipment according to the third aspect hereof may be implemented in quite a practical constitution using commercialized products.

According to the fifth aspect of the invention, the grain pieces of silica gel are each located in each of the meshes of the meshed ground structure of the case member formed of the flexible pile weave fabric so as to be prevented from making mutual contact. Furthermore, the grain pieces are locked in the case member in a state where the individual grain pieces are wrapped in each of net-like pile portions of the pile weave fabric. This makes the grain pieces freer to move as compared with the case where the grain pieces are bonded together by means of the bonding agent or adhesive. Hence, the mat is increased in the area of vibration dissipation surface so as to be able to dissipate the sound waves in the atmosphere quickly. Particularly, the mat contributes to the improvement of the reproduction of high-frequency components.

The mat offers another advantage of negating the need for bonding the grain pieces so that the single-layer structure of the grain pieces may be formed irrespective of the adhesion strength of the individual grain pieces.

According to the sixth aspect of the invention, the case member comprises the pile weave towel cloth. Therefore, the mat for use with acoustic equipment according to the sixth aspect hereof may be implemented in quite a practical constitution using a commercialized product.

According to the seventh aspect of the invention, the mat for use with acoustic equipment is formed in a double-layer structure wherein the support substrate is sandwiched between the layers of the silica-gel grain pieces. In this case, the mat has a one-layer greater thickness than the single-layered mats according to the first to sixth aspects hereof. However, this mat may be very easily formed by attaching a single layer of the grain pieces to each of the upper and lower sides of the support substrate. Furthermore, this mat is much thinner than the aluminum insulator and the like and does not take up much space similarly to the single-layered mats.

When this acoustic equipment mat is disposed under the acoustic equipment such as an amplifier or speaker, the upper ends of the grain pieces on the upper side of the support substrate are in point contact with the bottom of the acoustic equipment while the lower ends of the grain pieces on the lower side of the support substrate are in point contact with the floor or the like. Hence, the area of contact between the mat and the acoustic equipment is dramatically decreased so that the vibrations reflected by the vibration incidence side of the mat (the upper ends of the grain pieces on the upper side of the support substrate) and the vibrations reflected by the vibration exit side thereof (the lower ends of the grain pieces on the lower side of the support substrate) are reduced notably.

The support substrate is so thin as to have very little influence on the vibrations and is also flexible to impart flexibility to the mat thereby suppressing the vibration reflection at the vibration incidence side and the vibration exit side of the mat.

The mat may be quite easily formed at low costs by using the inexpensive grain pieces of silica gel. Similarly to the aforementioned single-layered mats, a novel mat for use with acoustic equipment is provided which is implemented in the light-weight, thin and compact configuration, which is capable of reducing the vibrations from the acoustic equipment such as an amplifier or speaker by dissipating the vibrations very quickly and adequately, and which offers a great effect to improve the acoustic characteristic of the acoustic equipment.

According to the eighth aspect of the invention, the support substrate employs the double-sided tape, thereby allowing the double-layered acoustic equipment mat to be formed easily at much lower costs. According to the ninth aspect of the invention, the double-sided tape has a mesh configuration so that the influence of the tape is minimized. Hence, the mat may achieve an even greater effect to improve the acoustic characteristic of the acoustic equipment.

According to the tenth aspect of the invention, the carbon coated on the grain pieces has much higher vibration propagation speed than silica gel and aluminum. Hence, the mat is adapted to more quickly dissipate the vibrations from the acoustic equipment in the atmosphere via the surfaces of the grain pieces. The mat is particularly effective to reduce the vibrations of an acoustic equipment housed in a metal casing formed from aluminum or the like having a high vibration propagation speed.

From a practical standpoint, it is preferred that the grain pieces substantially have a spherical shape having diameters in the range of 1 mm to 10 mm (the eleventh aspect). As demonstrated by an auditory test and the like, the grain pieces may preferably comprise B-type silica gel (the twelfth aspect).

Figure 1:
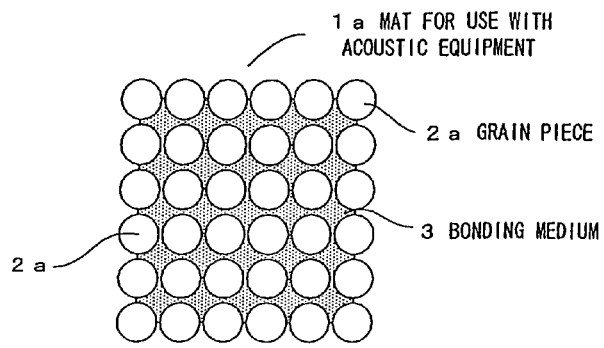
FIG. 1 is a plan view showing an acoustic equipment mat according to a first embodiment of the invention.

DESCRIPTION OF REFERENCE CHARACTERS 1a, 1aa, 1ab, 1b, 1ba, 1c, 1ca, 1bα, 1bβ, 1cα, 1cβ: acoustic equipment mat
2a, 2b, 2c: grain piece
3: bonding medium
4, 4x, 4y: speaker
7, 21: double-sided tape
10: MD player
11: amplifier
18: mesh substrate
18a, 20c: mesh
19: adhesive substrate
20: case member
p: pile
g: meshed ground structure

BEST MODES FOR CARRYING OUT THE INVENTION

Next, description is made on the embodiments of the invention with reference to FIG. 1 to FIG. 43.

First Embodiment

First, a first embodiment having a single-layer structure of silica-gel grain pieces (equivalent to the first and second aspects hereof) is described with reference to FIG. 1 to FIG. 6.

Figure 2:
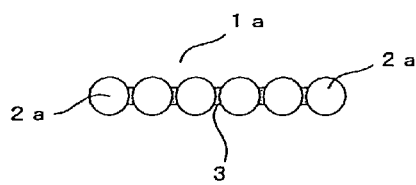
FIG. 2 is a front view of the mat shown in FIG. 1.
Figure 3:
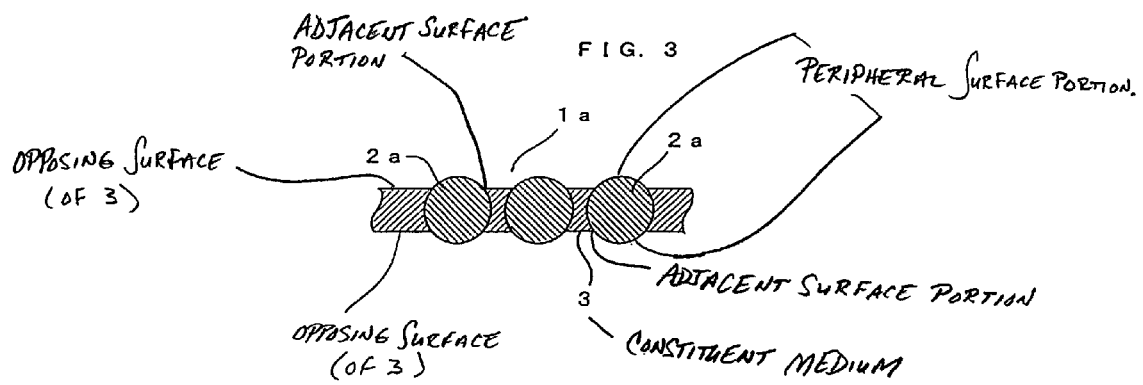
FIG. 3 is a fragmentary enlarged sectional view of the mat shown in FIG. 1.
Figure 4:
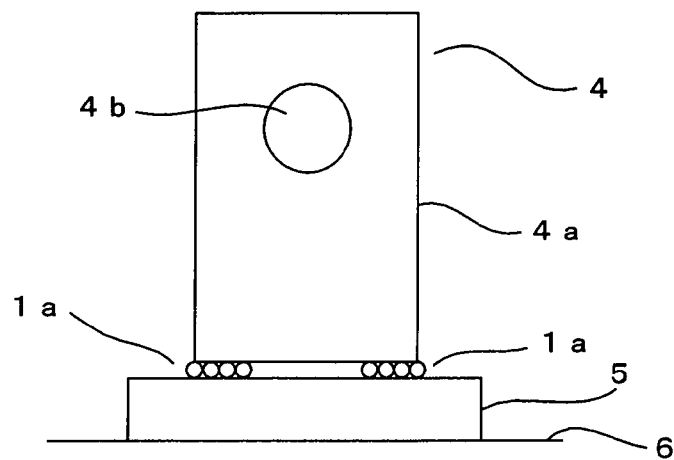
FIG. 4 is a front view showing an example of the use of the mat shown in FIG. 1.
Figure 5:
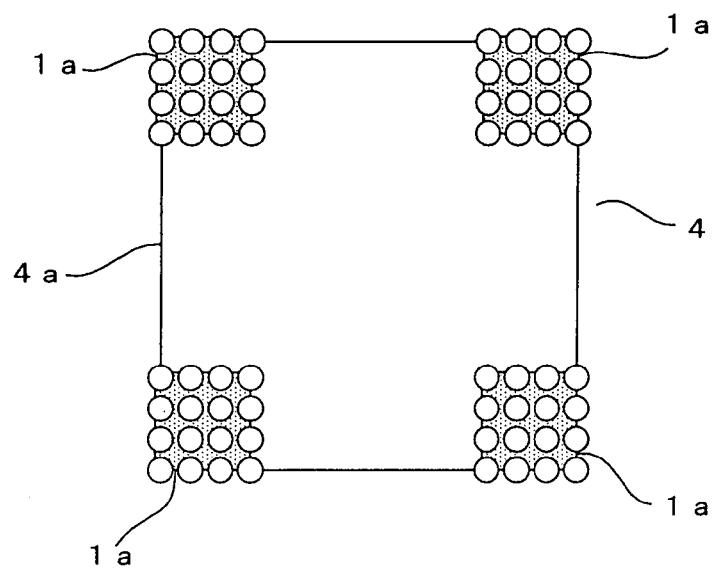
FIG. 5 is a bottom plan view of FIG. 4, a part of which is removed.
Figure 6:
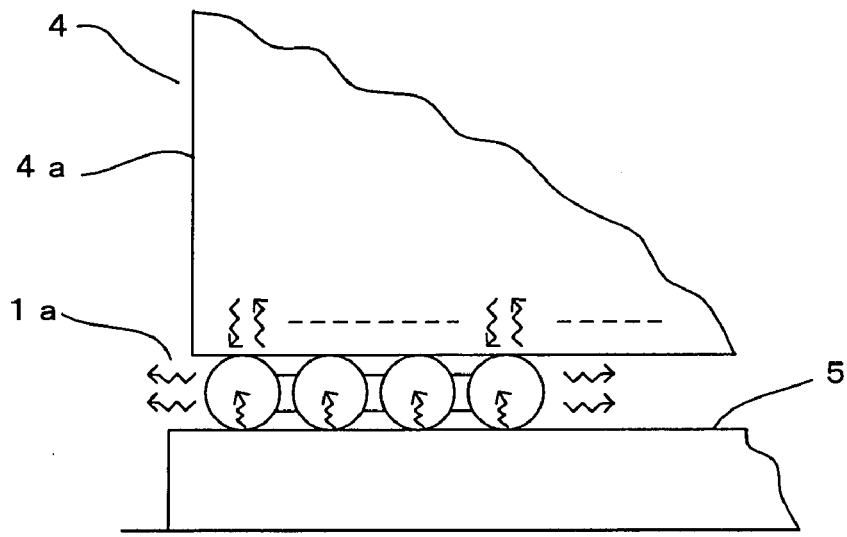
FIG. 6 is a diagram explaining how the vibrations of FIG. 4 are dissipated.

FIG. 1 is a plan view, FIG. 2 is a front view, and FIG. 3 is a fragmentary sectional view. FIG. 4 is a front view showing an example of use. FIG. 5 is a bottom plan view as seen from a bottom of a speaker shown in FIG. 4, a part of which is removed. FIG. 6 is a diagram explaining vibration dissipation. As shown in FIG. 1 and FIG. 2, an acoustic equipment mat 1a according to the embodiment is formed in a single-layer structure wherein a plurality of silica-gel grain pieces 2a are arranged in a single layer.

The grain pieces 2a may be silica-gel grain pieces having various diameters. From a practical standpoint, the grain pieces may preferably be substantially spherical grain pieces (spherical silica-gel grains) having diameters in the range of 1 mm to 10 mm and easily formed from a silica-gel powder by a molding process or the like (equivalent to the eleventh aspect hereof).

The silica gel is broadly classified into A-type and B-type which have different hygroscopicities. The grain pieces 2a may be formed from both of A-type silica gel and B-type silica gel. As suggested by an auditory test and the like, however, it is preferred to form the grain pieces 2a from the B-type silica gel. For instance, inexpensive B-type (spherical) silica-gel grains commonly used as a demoisturizer, deodorizer and the like may preferably be used as the grain pieces 2a (equivalent to Claim 12).

The B-type silica gel is preferred for the following reason. The A-type silica gel has a micro void structure less prone to release absorbed moisture, whereas the B-type silica gel has a large void structure in which the absorbed moisture is evaporated by heating so that voids are re-produced and which contains a large quantity of voids. Accordingly, the vibrations to be dissipated are propagated for shorter distance in the B-type silica gel and hence, the B-type silica gel is capable of dissipating the vibrations in the atmosphere more quickly.

As shown in FIG. 3, the grain pieces 2a in adjoining relation are bonded to each other at their peripheries by means of a bonding medium 3 including a bonding agent or adhesive, whereby the individual grain pieces 2a are arranged to form the single-layer structure.

Therefore, the acoustic equipment mat 1a may be easily formed at low costs by using the grain pieces 2a formed of, for example, the inexpensive (spherical) silica-gel grains commonly used as the demoisturizer, deodorizer and the like and by bonding together the adjoining grain pieces 2a by means of the bonding medium 3. The formation of the mat negates the need for a costly precision processing such as metal working. In this case, the mat has a much smaller weight than the rubber or lead vibration insulator or the aluminum insulator. Furthermore, the mat has a thickness equivalent to the size of the grain pieces 2a, which is much smaller than the thicknesses of the aforementioned insulators.

Silica gel is harmless to humans. If silica gel should be swallowed by mistake, there is no ill effect on the human body. Hence, this acoustic equipment mat 1a advantageously has high safety and environmentally-friendly feature.

The acoustic equipment mat 1a may be formed in any size. The mat may be formed in a size according to the size of a bottom surface of an acoustic equipment or the size of a bottom of each of the feet thereof. In the case of a mat designed for general purposes, the mat may be formed in a square, 5 cm to 10 cm on a side, for example, so that a required number of mats may be arranged in use.

Specifically, in a case where the acoustic equipment is a speaker of a so-called audio system, the acoustic equipment mat 1a is disposed under each of the four corners of a bottom of a wood-box type casing 4a, for example, of a speaker 4, as shown in FIG. 4 and FIG. 5. In FIG. 4, a main body unit (speaker unit) of the speaker 4 is represented by 4b, and a speaker table such as a speaker stand set on a floor 6 is represented by 5. The acoustic equipment mats 1a are laid on the speaker table, and the speaker 4 is set on the mats.

In this case, silica gel is harder than aluminum so that the acoustic equipment mats 1a do not suffer breakage or deformation as disposed under the heavy acoustic equipment such as the speaker 4.

If an aluminum plate is disposed under the speaker 4 in place of the acoustic equipment mats 1a, the aluminum plate must have a substantial thickness such as to withstand the weight of the speaker. Hence, the aluminum plate cannot be formed so thin as the acoustic equipment mat 1a.

When the acoustic equipment mats 1a are disposed under the speaker 4, the individual spherical grain pieces 2a of silica gel arranged in a single layer are located at any of the four corners of the bottom of the speaker casing 4a and have their upper ends in point contact with the bottom of the speaker casing 4a and have their lower ends in point contact with an upper surface of the underlying speaker table 5. The vibrations of the speaker casing 4a produced in conjunction with the reproduction and output of music sound or the like of a CD or MD are propagated, via the upper ends of the spherical grain pieces 2a, to the acoustic equipment mats 1a at the four corners of the speaker casing 4a in point contact with the grain pieces. In the meantime, the vibrations reflected from the table 5 (indirect vibrations) are propagated to the acoustic equipment mats 1a via the lower ends of the spherical grain pieces 2a in point contact with the table.

By the way, it is well known that when the vibrations such as ultrasonic waves and sound waves impinge on a vibration insulating material (e.g., a B-phase vibration insulating material shown in FIG. 20), such as the acoustic equipment mat 1a or aluminum plate, which is adapted for quick dissipation of the sound waves, the vibrations are reflected by or attenuated at a vibration incidence surface thereof, an internal portion thereof and a vibration exit surface thereof which is opposite to the incidence surface.

The effect to improve the acoustic characteristic as offered by the above vibration insulating material is thought to increase with the decrease of the following factors 1 to 4 adversely affecting the sound quality.

(1) the quantity of vibrations reflected by the vibration incidence surface of the vibration insulating material (The sound quality is lowered with the increase of the quantity of reflected vibrations);

(2) the vibration propagation distance or the thickness of the vibration insulating material (As increased in the thickness, the vibration insulating material takes the longer time to dissipate the vibrations and hence, the sound quality is lowered accordingly);

(3) the atomic weight of a material constituting the vibration insulating material (A material having the greater atomic weight takes the longer time to allow the vibrations to be propagated through the vibration insulating material and dissipated therefrom); and (4) the quantity of vibrations reflected by the vibration exit surface of the vibration insulating material (With the increase of the quantity of reflected vibrations, the vibration insulating material takes the longer time to dissipate the vibrations and hence, the sound quality is lowered accordingly).

The acoustic equipment mat 1a as the vibration insulating material has small areas of contact with the speaker 4 and the speaker table 6 so that the quantities of the vibrations reflected by the vibration incidence surface (the upper ends of the grain pieces 2a) and of the vibrations reflected by the vibration exit surface (the lower ends of the grain pieces 2a) on the opposite side are quite small.

Furthermore, the acoustic equipment mat 1a is thin and composed of an assembly of plural grain pieces 2a arranged in a layer. Therefore, the mat has a greater surface area than the aluminum plate or the like so that the vibrations are quickly dissipated from the surfaces of the grain pieces 2a. What is more, silicon dioxide ($SiO_2$) as the major component of silica gel constituting the mat 1a propagates the vibrations or sound waves very quickly because silicon, having an atomic number of 13, is slightly heavier than aluminum (Al) but oxygen, having an atomic number of 8, is lighter than aluminum (Al). Specifically, rock crystal propagates the sound waves at 5720 m/s, which is slightly lower than a sound propagation speed of aluminum (Al) (6260 m/s) but is much higher than a sound propagation speed of wood (fir wood passing sound along fibers at 4700 m/s).

Therefore, the acoustic equipment mat 1a is superior to aluminum in terms of every one of the above factors 1 to 4. Because of silicon dioxide substantially having as high propagation speed as aluminum, the mat is capable of quickly dissipating the vibrations from the acoustic equipment such as the speaker 4 in the atmosphere via the surfaces of the grain pieces 2a.

Hence, the acoustic equipment mat 1a may be easily formed at low costs by using the inexpensive grain pieces 2a of silica gel and negates the need for the costly precision processing such as the metal working. Furthermore, the mat has a light-weight and thin structure which is not cumbersome in use and is adapted to reduce the vibrations from the acoustic equipment such as the speaker 4 by adequately dissipating the vibrations much more quickly as compared with the case where the aluminum insulator is used. Thus, the mat contributes to the finely and richly expressive reproduction of the music sound or the like represented by the high-speed signals having the broad dynamic range.

This acoustic equipment mat 1a is effective as disposed under not only the speaker 4 but also a variety of acoustic equipment such as amplifiers, CD players and MD players. Accordingly, the mat not only provides for the improvement of acoustic characteristic of a full-scale audio system operated for music appreciation but also provides for the improvement of acoustic characteristic of a compact stereo system or a radio-cassette player operated for the music appreciation and the improvement of the quality of sound outputted from electronic music instruments and such or recorded at a recording site.

The acoustic equipment mat 1a may be used as follows. An auditory test is performed by operating an acoustic equipment with the mat disposed thereunder. According to the test result, one or more acoustic equipment mats 1a may be disposed under a part of or the overall area of the bottom of the acoustic equipment. In a case where the acoustic equipment is supported on feet, the mats 1a may be disposed under the bottoms of the all or some of the feet.

Second Embodiment

Next, a second embodiment illustrating another example of the above single-layer structure (equivalent to the third and fourth aspects hereof) is described with reference to FIG. 7 to FIG. 9.

Figure 7:
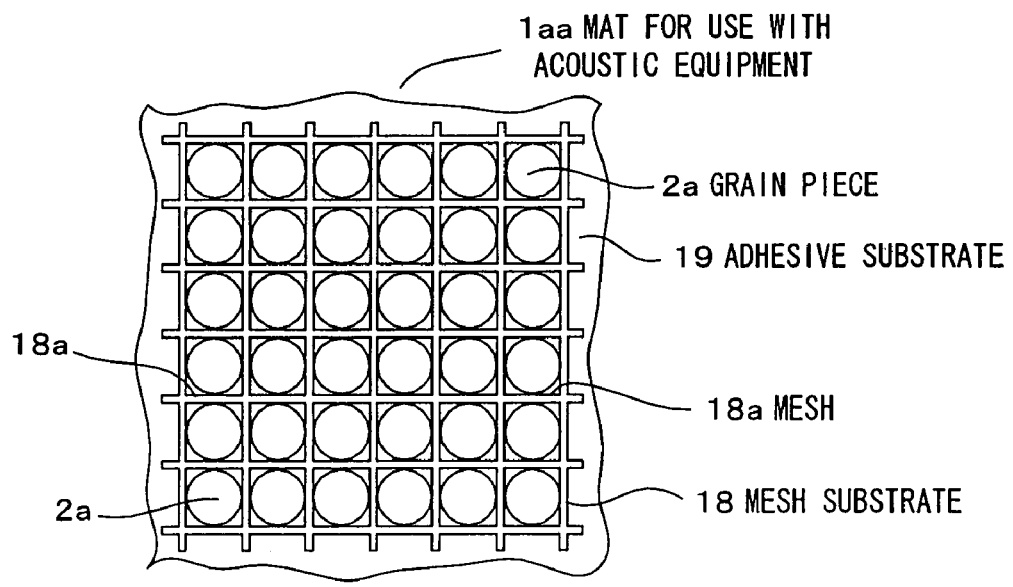
FIG. 7 is a plan view showing an acoustic equipment mat according to a second embodiment of the invention.
Figure 8:
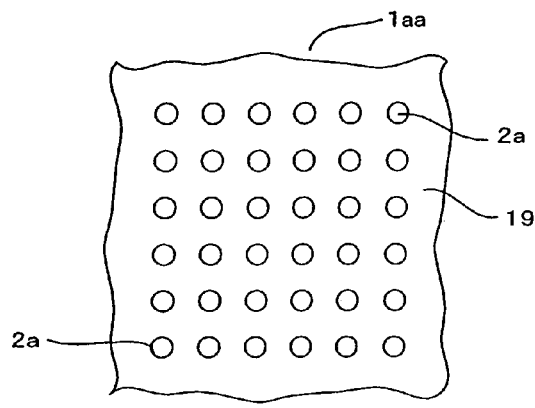
FIG. 8 is a back-side view of the mat shown in FIG. 7.
Figure 9:
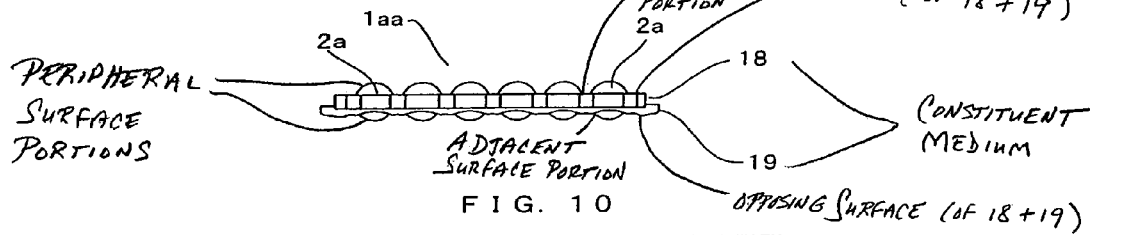
FIG. 9 is a front view of the mat shown in FIG. 7.

FIG. 7 is a plan view showing an acoustic equipment mat 1aa, FIG. 8 is a back-side view thereof, and FIG. 9 is a front view thereof. As shown in these figures, the acoustic equipment mat 1aa is formed by bonding together a flexible mesh substrate 18 in a mesh-sheet form and a more flexible thin-film adhesive substrate 19 as interposing the grain pieces 2a between these substrates.

According to the embodiment, the mesh substrate 18 is prepared by cutting a glass-fiber mesh tape to a suitable length, the mesh tape commercially available as a mesh tape for repairing gaps or cracks in a building material. If the grain pieces 2a have grain sizes on the order of 2 mm, each mesh 18a of the mesh substrate has a size of about 2 mm×2 mm, and each vertical or horizontal strand between adjoining meshes 18a has a width on the order of 0.5 mm. The mesh substrate is applied with an adhesive on a back side thereof.

In the acoustic equipment mat 1aa, the mesh substrate 18 includes 6×6 meshes 18a (vertical meshes×horizontal meshes). In a case where the acoustic equipment mat 1aa is formed substantially in a 5 cm×5 cm size more suited for general purpose use, the mesh substrate 18 includes 15×17 meshes 18a provided that the grain pieces 2a have sizes on the order of 2 mm.

The adhesive substrate 19 is in the form of a thin film (tissue paper) having a slightly (one size) greater area than that of the mesh substrate 18. In the embodiment, the adhesive substrate is prepared by cutting a commercially available adhesive bandage to a suitable length, the bandage formed of an unwoven fabric or butter muslin in a thin-film form and applied with an adhesive on one side thereof. The adhesive substrate is elastic, and is much more flexible and much thinner than the mesh substrate 18. The adhesive substrate 19 having small holes formed just as produced by piercing an eyeleteer therethrough is bonded to the mesh substrate 18, the individual small holes located centrally of the respective meshes 18a of the mesh substrate.

The grain pieces 2a have their sizes substantially uniformized in accordance with the size of the meshes 18a. If the meshes 18a of the mesh substrate 18 have a 2 mm×2 mm size, the grain size is on the order of 2 mm, as described above. Each of the grain pieces is pressed against each of the meshes 18a of the mesh substrate 18 so as to be embedded therein and positioned at place.

In this case, the individual grain pieces 2a are positioned by the respective meshes 18a so as to be arranged in a single layer as prevented from making mutual contact. Furthermore, the individual grain, pieces are exposed at their upper ends. If the grain pieces 2a have a larger size than that of the meshes 18a, the mesh substrate 18 is elastic so that the meshes 18a are expanded to accommodate the grain pieces.

As pressed against the mesh substrate, the grain pieces 2a push and expand the small holes of the adhesive substrate 19 so as to project and expose the lower ends thereof from the adhesive substrate 19. In this state, the grain pieces 2a are bonded to the adhesive substrate 19 and held between these substrates 18, 19.

In the acoustic equipment mat 1aa, the grain pieces 2a are arranged in a single layer as exposing their upper ends and lower ends from the laminate of the substrates 18, 19. In a case where this acoustic equipment mat 1aa is disposed under the speaker casing 4a or the like, the vibrations of the speaker casing 4a, for example, are propagated to the acoustic equipment mat 1aa via the upper ends of the grain pieces 2a in point contact with the speaker casing, and are quickly dissipated from the surfaces of the grain pieces 2a. Similarly to the first embodiment mentioned above, the mat may reduce the vibrations by extremely quickly and adequately dissipating the vibrations. Thus, the mat contributes to the finely and richly expressive reproduction of the music sound or the like represented by the high-speed signals having the broad dynamic range.

Since the adhesive substrate 19 formed of the adhesive bandage is extremely thin, the acoustic equipment mat 1aa as a whole is decreased in thickness d at bonded portions of the grain pieces 2a as compared with the case where the grain pieces 2a are bonded together by means of the bonding agent. Hence, the laminate of the substrates 18, 19 has less influence than the first embodiment so that the mat is further increased in the vibration reduction effect.

Because of the individual meshes 18a of the mesh substrate 18, the individual grain pieces 2a are substantially regularly arranged in a manner to be prevented from making mutual contact. Additionally, the individual grain pieces 2a are substantially uniformized in size. This prevents an irregular formation of agglomerations of plural grain pieces 2a wherein the thickness d at the bonded portions of the grain pieces is increased to 2 d, 3 d or such with respect to the horizontal direction. Hence, a vibration dissipation time of the acoustic equipment mat 1aa as a whole is uniformized based on the vibration dissipation time of each of the grain pieces 2a having the uniform size. This not only minimizes the characteristic degradation of the grain pieces 2a caused by the mutual contact thereof, but also prevents the reproduced sounds from making unclear harmony due to the size variations of the grain pieces 2a. Accordingly, the mat is further increased in the vibration reduction effect.

The acoustic equipment mat 1aa having the structure wherein the grain pieces 2a are made to adhere to the adhesive substrate 19 and held between the substrates 18, 19 has such a rigidity as to obviate the deformation of the individual meshes 18a, the rigidity imparted by the mesh tape constituting the mesh substrate 18. In addition, the mat has flexibility imparted by the adhesive bandage constituting the adhesive substrate 19. The flexibility of the mat is not impaired unlike the case where the components are bonded together by means of the bonding agent. Therefore, the mat is further increased in the vibration reduction effect.

It is noted that either of the mesh substrate 18 and the adhesive substrate 19 may be placed upwardly (on the front side of the mat) when the acoustic equipment mat 1aa is disposed under the speaker casing 4a or the like.

The acoustic equipment mat 1aa is formed by making the individual grain pieces 2a adhere to the adhesive substrate 19 and arranging the grain pieces in a single layer. Therefore, the formation of this mat is free from restrictions such as the curing time of the bonding agent in a case where the individual grain pieces 2a are bonded together so as to be arranged in a single layer. That is, the mat is not required to be fabricated within the curing time or to be allowed to rest on a flat table till the bonding agent is cured. Hence, the mat advantageously provides a high degree of freedom of the formation (fabrication) process.

Since the mesh substrate 18 is formed of the commercially available mesh tape and the adhesive substrate 19 is formed of the commercially available adhesive bandage, the acoustic equipment mat 1aa may be implemented in the extremely practical and inexpensive constitution using the commercialized products.

By the way, a similar acoustic equipment mat may be formed without using the adhesive substrate 19 but by using two mesh substrates 18, for example. The individual grain pieces 2a are supported as held between the upper and lower mesh substrates, whereby the grain pieces 2a are supported at contact points with the meshes. However, the grain pieces are supported less stably as compared with the case where the adhesive substrate 19 is used for adhesively supporting the grain pieces 2a substantially at their overall peripheries.

Third Embodiment

Next, a third embodiment illustrating still another example of the above single-layer structure (equivalent to the fifth and sixth aspects hereof) is described with reference to FIG. 10 to FIG. 13.

Figure 10:
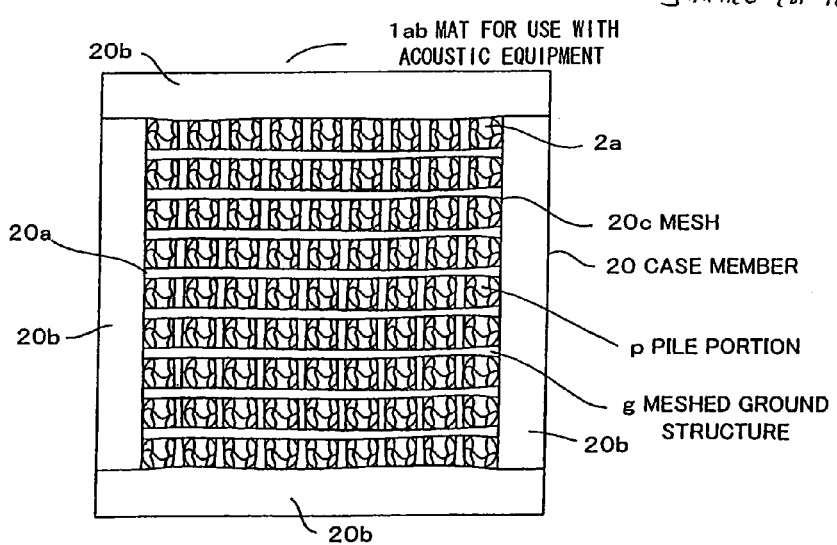
FIG. 10 is a plan view showing an acoustic equipment mat according to a third embodiment of the invention.
Figure 11:
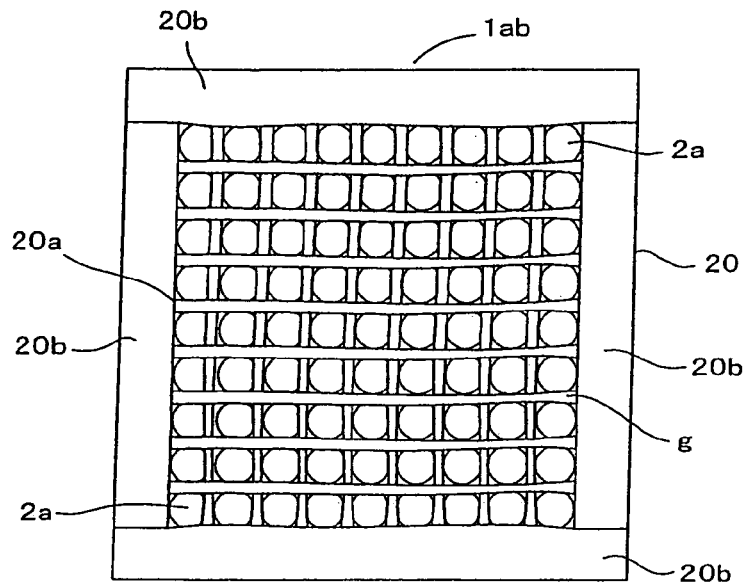
FIG. 11 is a back-side view of the mat shown in FIG. 10.
Figure 12:
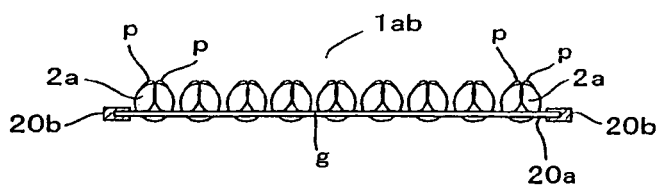
FIG. 12 is a partially cut-away front view of the mat shown in FIG. 10.
Figure 13:
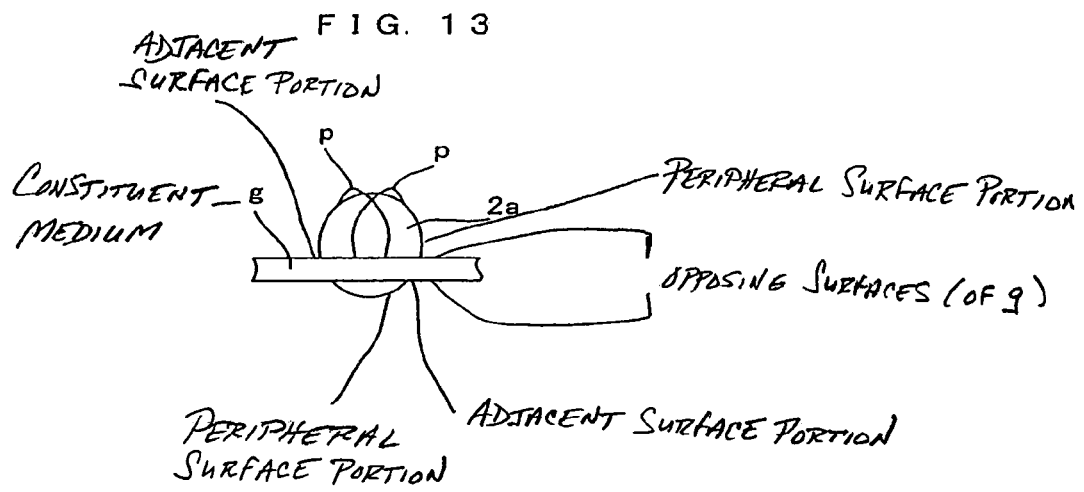
FIG. 13 is a diagram explaining how a grain piece is locked in the mat shown in FIG. 10.

FIG. 10 is a plan view showing an acoustic equipment mat 1*ab*, FIG. 11 is a back-side view thereof, and FIG. 12 is a sectional front view thereof. FIG. 13 is a diagram explaining how a grain piece is locked in the mat. As shown in the figures, the acoustic equipment mat 1*ab* includes a case member 20 formed of a flexible pile weave fabric.

The case member 20 according to the embodiment includes: an accommodating portion 20*a* formed by cutting pile weave towel cloth to a 5 cm×5 cm size for example, the towel cloth commercially available as body towel, bath towel and such; and a paper tape 20*b* or an adhesive paper-based tape for sandwichingly covering edges of the four sides of the accommodating portion 20*a* in order to prevent the edges from fraying.

The above pile weave towel cloth is formed by weaving a pile p weft into a meshed ground structure g as a pile weave foundation cloth (ground). The meshed ground structure g of the case member 20 includes 16×15 meshes 20*c*, for example.

Each of the grain pieces 2*a* is embeddedly disposed in each of the meshes 20*c*. It is preferred in this case that the individual grain pieces 2*a* substantially have a uniform size slightly greater than the size of the meshes 20*c* in order to prevent the individual grain pieces 2*a* from falling off from the meshed ground structure g and from making mutual contact. If the individual meshes 20*c* substantially have a 2 mm×3 mm size, a specific size of each of the grain pieces 2*a* is slightly greater than 2 mm.

The grain pieces 2*a* embeddedly disposed in the respective meshes 20*c* are locked in the case member 20 as wrapped in respective net bags each formed of the pile portion p defined by plural threads. Thus, the grain pieces are arranged in a single layer.

As shown in FIG. 13, the above net bag may preferably be formed, for example, by extending the threads of the pile portion p crisscross in order to ensure that the individual grain pieces 2*a* are locked in the case member 20.

In the acoustic equipment mat 1*ab* formed in this manner, respective ends of the grain pieces 2*a* are projected through the meshes 20*c* to be exposed from the meshed ground structure g while the other ends of the grain pieces are exposed from the respective bags of the pile portions p. In this case, the following effect may be obtained because the pile portions p are each formed of plural thin threads. When the acoustic equipment mat 1*ab* is used as disposed under the speaker casing 4*a* or the like, the weight of the speaker casing 4*a* or the like is applied to the mat so that the grain pieces 2*a* are exposed at their upper and lower ends and are practically arranged in a single layer. Just as in the acoustic equipment mats 1*a*, 1*aa* of the above first and second embodiments, the vibrations of the speaker casing 4*a*, for example, are propagated to the acoustic equipment mat 1*ab* via the upper ends of the grain pieces 2*a* in point contact with the speaker casing, and are quickly dissipated from the surfaces of the grain pieces 2*a*. Similarly to the first embodiment mentioned above, the mat may reduce the vibrations by extremely quickly and adequately dissipating the vibrations. Thus, the mat contributes to the finely and richly expressive reproduction of the music sound or the like represented by the high-speed signals having the broad dynamic range.

Furthermore, the grain pieces 2*a* are each disposed in each of the meshes 20*c* of the meshed ground structure g of the case member 20 formed of the soft pile weave fabric so as to be prevented from making mutual contact. In addition, the grain pieces 2*a* are locked in the case member 20 as wrapped in the respective net bags defined by the pile portions p and are arranged in a single layer. As compared with the case where the grain pieces are attached by means of the bonding agent or adhesive, therefore, the individual grain pieces 2*a* are freer to move so as to provide an increased area of vibration dissipation surface. Hence, the mat is capable of quickly dissipating the sound waves in the air. Particularly, the mat has an advantage of improving the reproduction of high-frequency components.

When the acoustic equipment mat 1*ab* is disposed under the speaker casing or the like, it is preferred to place the pile portions p upwardly (the front side of the mat) and to place the meshed ground structure g downwardly (the back side of the mat) in order to prevent the grain pieces 2*a* from falling off from the mat. In some cases, however, the mat may be used as placed in the opposite way.

The acoustic equipment mat 1*ab* negates the need for bonding the grain pieces 2*a* and hence, is advantageous in that the single-layer structure of the grain pieces 2*a* may be formed irrespective of the adhesion strength of the grain pieces 2*a*. Particularly, this constitution is quite useful in a case where grain pieces of silica gel coated with a carbon coat (to be described herein later) are used in place of the grain pieces 2*a*, because there is no fear of separation of the carbon coat. The coat separation will occur in a case where the coated grain pieces are bonded together.

Since the case member 20 is formed of the pile weave towel cloth, the acoustic equipment mat 1*ab* may be implemented in the extremely practical and inexpensive constitution using the commercialized products.

In stead of using the paper tape 20*b*, flat fell seams of the pile weave towel portion may be sewn to prevent the edges thereof from fraying.

Fourth Embodiment

Next, a fourth embodiment having a double-layer structure of silica-gel grain pieces (equivalent to Claims the seventh and eighth aspects hereof) is described with reference to FIG. 14 to FIG. 17.

Figure 14:
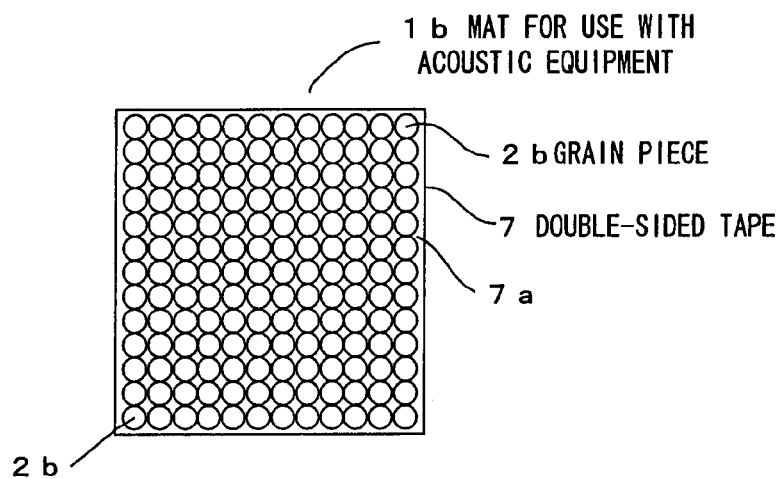
FIG. 14 is a plan view showing an acoustic equipment mat according to a fourth embodiment of the invention.
Figure 15:
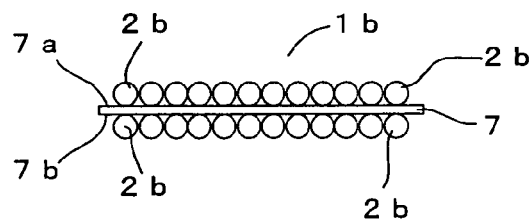
FIG. 15 is a front view of the mat shown in FIG. 14.
Figure 16:
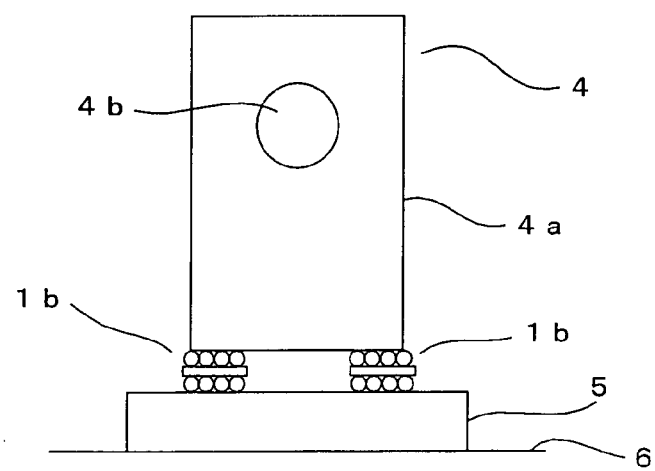
FIG. 16 is a front view showing an example of the use of the mat shown in FIG. 14.
Figure 17:
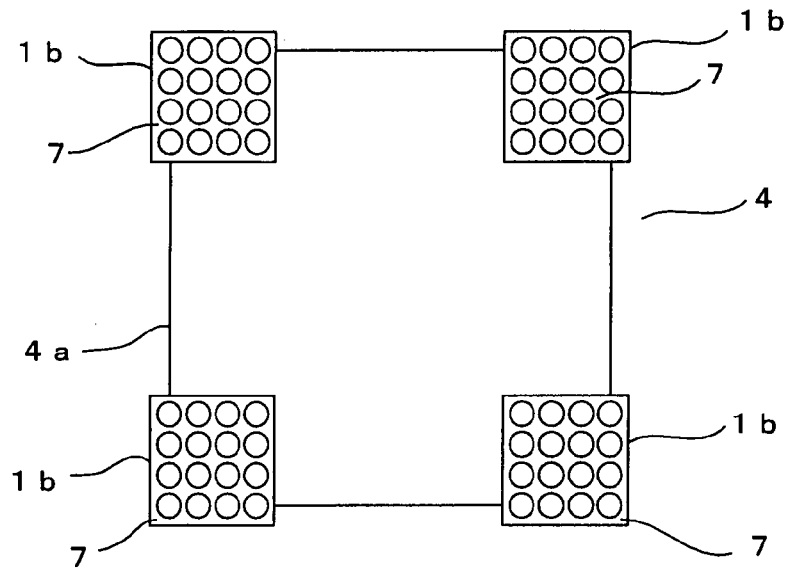
FIG. 17 is a bottom plan view of FIG. 16, a part of which is removed.

FIG. 14 is a plan view corresponding to FIG. 1, and FIG. 15 is a front view of a mat shown in FIG. 14. FIG. 16 is a front view showing an example of the use of the mat corresponding to that of FIG. 4, and FIG. 17 is a view of the mat as seen from a bottom of the speaker 4*b* shown in FIG. 16.

As shown in FIG. 14, FIG. 15, an acoustic equipment mat 1*b* according to this embodiment has a double-layer structure of silica-gel grain pieces bonded to a double-sided tape 7. The double-layer structure is formed by attaching a single layer of plural gain pieces 2*b*, resemblant to the grain pieces 2*a* of the first embodiment, to respective sides (upper side 7*a*, lower side 7*b*) of the double-sided adhesive tape 7 as a flexible thin-film support substrate by means of an adhesive applied to the both sides 7*a*, 7*b* of the tape.

In this case, each of the single layers of the grain pieces 2*b* bonded to the upper side 7*a* and the lower side 7*b* of the double-sided tape 7 is equivalent to the single layer of the grain pieces 2*a* of the first embodiment, as shown in FIG. 15 and the like. Accordingly, the acoustic equipment mat 1*b* of the embodiment is formed to be substantially twice as thick as the acoustic equipment mat 1*a* of the first embodiment. However, the mat 1*b* may be readily formed by attaching the grain pieces 2*b* to the both sides 7*a*, 7*b* of the double-sided tape 7.

Hence, the mat 1b has an advantage of being more easily fabricated as compared with the first embodiment wherein the mat is formed by bonding together the grain pieces 2a by means of the bonding medium 3.

Similarly to the grain pieces 2a of the first embodiment, the grain pieces 2b may be silica-gel grain pieces having various grain sizes. From a practical standpoint, the grain pieces may preferably be substantially spherical grain pieces (spherical silica-gel grains) having diameters in the range of 1 mm to 10 mm and easily formed from a silica-gel powder by molding process or the like. While the grain pieces 2b may be formed from both of A-type silica gel and B-type silica gel, it is preferred to form the grain pieces 2b from B-type silica gel. For instance, inexpensive B-type silica gel (spherical) grains commonly used as a demoisturizer, deodorizer and the like may preferably be used for forming the grain pieces 2b.

Therefore, the acoustic equipment mat 1b may be quite easily formed at low costs by attaching the grain pieces 2b to the both sides 7a, 7b of the double-sided tape 7, the grain pieces 2b formed from, for example, the inexpensive (spherical) silica-gel grains commonly used as the demoisturizer, deodorizer and the like. The formation of the mat negates the need for the costly precision processing such as the metal working. Furthermore, the mat has a much smaller weight than the rubber or lead vibration insulator or the aluminum insulator and also has a thickness much smaller than those of the aluminum insulator and the like. What is more, this mat is quite safe to use.

The acoustic equipment mat 1b may be formed in any size similarly to the acoustic equipment mat 1a of the first embodiment. The mat may be formed in a size according to the size of a bottom surface of an acoustic equipment or the size of a bottom of each of the feet thereof. In the case of a mat designed for general purpose use, the mat may be formed in a square, 5 cm to 10 cm on a side, for example, so that a required number of mats may be arranged in use.

The acoustic equipment mat 1b may be used the same way as the acoustic equipment mat 1a. In a case where the acoustic equipment is the speaker 4, the acoustic equipment mat 1b is disposed under each of the four corners of the bottom of the wood-box type casing 4a of the speaker 4, as shown in FIG. 16 and FIG. 17. In FIG. 16 and FIG. 17, the same reference characters as those of FIG. 4 and FIG. 5 represent the same components, respectively.

In this case, silica gel is harder than aluminum so that the acoustic equipment mats 1b do not suffer breakage or deformation as disposed under the heavy acoustic equipment such as the speaker 4.

The grain pieces 2b arranged in a single layer and attached to the upper side 7a of the double-sided tape 7 have their upper ends in point contact with the bottom of the speaker casing 4a, whereas the grain pieces 2b arranged in a single layer and attached to the lower side 7b of the double-sided tape 7 have their lower ends in point contact with the upper surface of the underlying table 5.

Therefore, the acoustic equipment mat 1b constitutes a vibration insulating material similar to the acoustic equipment mat 1a of the first embodiment.

In this case, the double-sided tape 7 is a commercially available double-sided adhesive tape based on a flexible synthetic-resin film, so that the tape may impart flexibility to the acoustic equipment mat 1b. When the tape is pressed by the grain pieces 2b in point contact therewith, the tape does not suffer breakage failure. The surfaces of the tape 7 are deformed in convexes and concaves at pressed portions and non-pressed portions. Because of the deformation, the tape does not maintain a flat surface orthogonal to a vibration propagation direction. Therefore, the vibration incidence surface and the vibration exit surface thereunder have inclinations varied from place to place. The vibrations from the speaker casing 4b are directly propagated to the vibration incidence surface, whereas the reflected vibrations are indirectly propagated to the vibration exit surface. Hence, the vibrations reflected by these surfaces are reduced even further so that the sound-quality degradation caused by the reflected vibrations is dramatically reduced.

The double-sided tape 7 is composed of a material having a great atomic weight and propagating the sound waves at low speed. However, the tape 7 has such a small thickness on the order of tens micrometers and hence, has very little influence on the propagation of vibrations.

Although it may be contemplated to replace the double-sided tape 7 with aluminum having a high sound propagation speed, an inflexible aluminum foil is prone to breakage failure and the like when pressed by the grain pieces 2b. This actually dictates the use of an aluminum plate having a thickness of not less than several millimeters rather than the aluminum foil. If such a thick aluminum plate is used, the vibrations reflected by the flat vibration incidence surface and the flat vibration exit surface are increased, so that the sound-quality degradation caused by the reflected vibrations becomes significant.

The vibrations of the speaker casing 4b caused by the speaker 4 reproducing/outputting the music sound and the like from the CD or MD, for example, are directly propagated to the acoustic equipment mat 1b via the upper ends of the upper grain pieces 2b attached to the upper side 7a and are indirectly propagated to the acoustic equipment mat 1b as reflected by the lower ends of the lower grain pieces 2b attached to the lower side 7b. Thus, the vibrations are dissipated just as illustrated by FIG. 6 explaining the vibration dissipation.

In this case, the vibration incidence surface of the acoustic equipment mat 1b and the vibration exit surface on the opposite side reflect less vibration. Furthermore, the acoustic equipment mat 1b has a great surface area by virtue of the double-layer structure constituted by the assemblies of plural grain pieces 2b. What is more, silicon dioxide as the major component of silica gel propagates the vibrations, such as sound waves, nearly as fast as aluminum. Therefore, the vibrations propagated from the speaker 4 to the acoustic equipment mat 1b are quickly dissipated in the atmosphere.

Hence, the acoustic equipment mat 1b may be quite easily formed at low costs by using the inexpensive silica-gel grain pieces 2b and double-sided tape 7 and besides, negates the need for the costly precision processing such as the metal working. Furthermore, the mat has the light-weight, thin structure which is not cumbersome in use. Similarly to the acoustic equipment mats 1a, 1aa, 1ab of the first to third embodiments, this mat is capable of reducing the vibrations from the acoustic equipment such as the speaker 4 by adequately dissipating the vibrations much more quickly than the case where the aluminum insulator or the like is used. Thus, the mat contributes to the finely and richly expressive reproduction of the music sound or the like represented by the high-speed signals having the broad dynamic range.

As a matter of course, this acoustic equipment mat 1b may also be used effectively as disposed under not only the speaker 4 but also a variety of acoustic equipment such as amplifiers, CD players and MD players. The mat provides for the improvement of acoustic characteristic of the audio system operated for music appreciation as well as the improvement of the quality of sound recorded at the recording site or outputted from the electronic music instruments and such.

The double-sided tape 7 may be any one of various types of flexible double-sided tapes. However, the double-sided tape may preferably have a meshed structure in the interest of more positive suppression of the vibration reflection. It goes without saying that the flexible thin-film support substrate may be constituted by a material other than the commercially available double-sided tapes.

By virtue of using the flexible support substrate such as the double-sided tape 7, the mat has an advantage of portability. For instance, when a portable CD player or MD player and this acoustic equipment mat 1b are carried as accommodated in a carrying bag, this mat 1b is so flexible as to be easily accommodated in the bag.

By the way, it may be contemplated to form an acoustic equipment mat of a single-layer structure by using a one-sided tape instead of the double-side tape and attaching a single layer of the grain pieces 2b to an adhesive side (one side) thereof. In this case, however, the overall area of the lower side of the one-sided tape is in contact with the upper surface of the table 5, so that a substantial quantity of vibrations is reflected by the lower ends of the grain pieces 2b. Therefore, the vibrations propagated from the speaker 4 to the acoustic equipment mat 1b (direct vibrations) nor the indirect vibrations cannot be dissipated in the atmosphere as quickly as in the acoustic equipment mats 1a, 1b.

Fifth Embodiment

Figure 18:
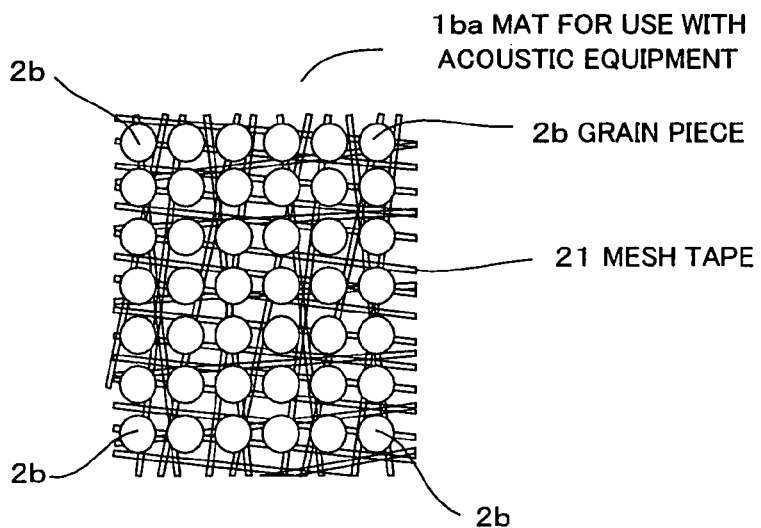
FIG. 18 is a plan view showing an acoustic equipment mat according to a fifth embodiment of the invention.
Figure 19:
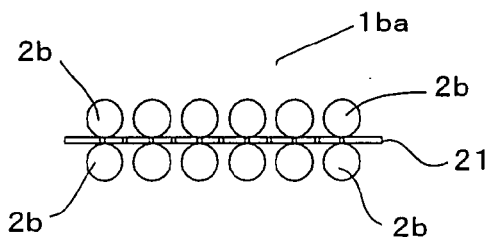
FIG. 19 is a front view of the mat shown in FIG. 18.

Next, a fifth embodiment illustrating another example of the double-layer structure of the silica-gel grain pieces (equivalent to the ninth aspect hereof) is described with reference to FIG. 18 and FIG. 19. FIG. 18 is a plan view of a mat, and FIG. 19 is a front view thereof.

An acoustic equipment mat 1ba of this embodiment differs from the acoustic equipment mat 1b of the above fourth embodiment in that the thin-film support substrate is constituted by a meshed double-sided tape (mesh tape) 21 instead of the double-sided tape 7 of the mat 1b.

This double-sided tape is, for example, a tape having an adhesive applied to the both sides of an extremely thin, open-meshed unwoven fabric or the like. Specifically, this tape is commercially available as a putying mesh tape used before putting up wall paper.

The mat employs the so-called open meshed double-sided tape (mesh tape) 21 so as to have minimal surface area and thickness (mean thickness of the overall acoustic equipment mat 1ba). Thus is minimized the influence of the double-sided tape 21, which constitutes a causative factor of slowing down the vibration dissipation. Hence, the whole body of the mat is increased in the vibration dissipation speed for providing a more smooth reproduction of high-frequency sound components, thus achieving a further increased effect to improve the acoustic characteristic of the acoustic equipment. As a result, the acoustic equipment mat 1ba is provided which has more excellent characteristics than the acoustic equipment mat 1b.

Sixth Embodiment

Next, a sixth embodiment including silica-gel grain pieces coated with a carbon coat (equivalent to the tenth aspect hereof) is described with reference to FIG. 20 to FIG. 22.

Figure 20:
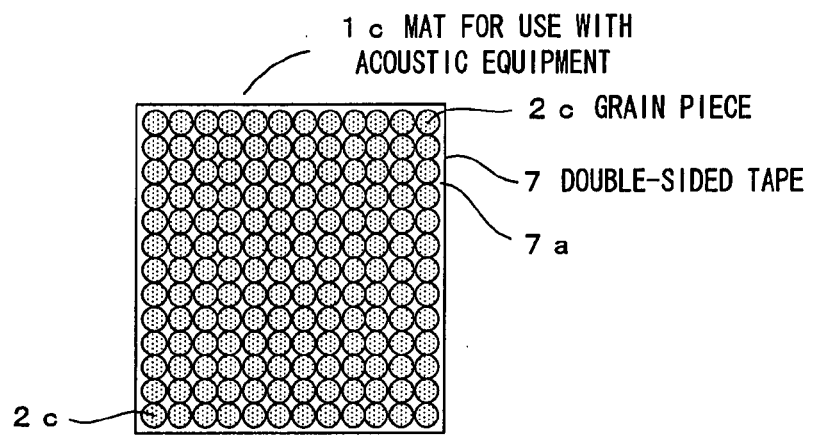
FIG. 20 is a plan view showing an acoustic equipment mat according to a sixth embodiment of the invention.
Figure 21:
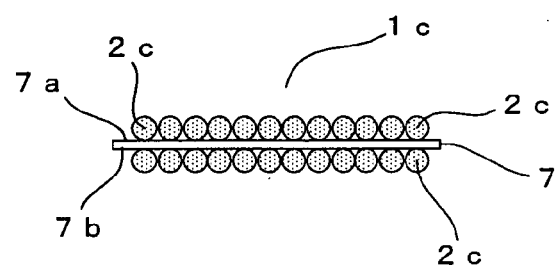
FIG. 21 is a front view of the mat shown in FIG. 20.

FIG. 20 is a plan view of a mat similar to that of FIG. 14, and FIG. 21 is a front view of the mat shown in FIG. 20. FIG. 22 is a fragmentary enlarged sectional front view of the mat shown in FIG. 20.

As shown in FIG. 20 and FIG. 21, an acoustic equipment mat 1c of this embodiment uses a plurality of carbon-coated grain pieces 2c (to be described as below) in place of the grain pieces 2b of the fourth embodiment and has a double-layer structure of the carbon-coated silica-gel grain pieces. The double-layer structure is formed by attaching a single layer of the grain pieces 2c to each of the upper side 7a and the lower side 7b of the double-sided tape 7 as the flexible thin-film support substrate by way of the adhesive on these sides 7a, 7b of the tape.

Figure 22:
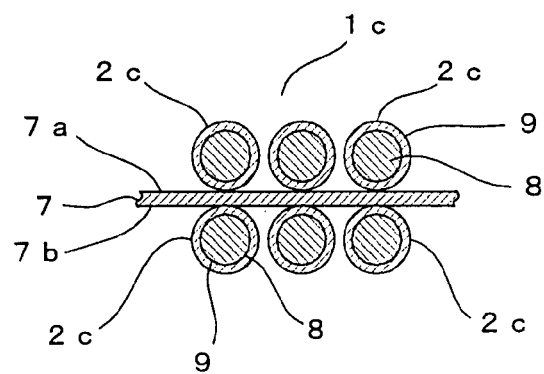
FIG. 22 is a fragmentary enlarged sectional view of the mat shown in FIG. 20.

As shown in FIG. 22, the grain pieces 2c are formed, for example, by applying a thin carbon coat 9 to silica-gel grains 8 resemblant to the silica-gel grain pieces 2b. The coat 9 may preferably have a minimal thickness from the viewpoint of minimizing the vibration propagation distance. In practice, however, the thickness of the carbon coat is decided based on the audio characteristic or manufacture costs.

In the acoustic equipment mat 1c having the double-layer structure of the grain pieces 2c, carbon (C) has a sound propagation speed of 10000 m/s, which is much higher than that of aluminum (6260 m/s) and that of silicon dioxide (5720 m/s based on rock crystal). That is, the mat is increased in the vibration propagation speed.

Hence, the carbon-coated mat for use with acoustic equipment 1c may be disposed under the acoustic equipment such as the amplifier or the CD player provided with a metal casing (including a chassis) principally formed of aluminum having the high sound propagation speed, so that the vibrations from the acoustic equipment are even more quickly propagated and dissipated in the atmosphere by virtue of the carbon coat 9 overlaid on the grain pieces 2c and the like. The mat offers an effect to dramatically improve the acoustic characteristic of the acoustic equipment. This effect is also confirmed by the auditory test and the like.

In a case where the acoustic equipment mat 1c is disposed under an open-ended aluminum chassis or the like, the mats may be disposed directly under the four corners of bent edges of a bottom of the aluminum chassis or under the bottoms of the four feet provided at the four corners thereof.

A single-layered carbon-coated mat for acoustic equipment may also be formed by arranging grain pieces coated with the carbon coat, such as the grain pieces 2c, in place of the grain pieces 2a of any one of the single-layered acoustic equipment mats 1a, 1aa, 1ab of the first to third embodiments. As a matter of course, this mat also offers the same effect as that of the acoustic equipment mat 1c. It is particularly preferred that the acoustic equipment mat 1ab of the third embodiment employs the carbon-coated grain pieces such as the grain pieces 2c in place of the grain pieces 2a. The mat is constituted to accommodate these grain pieces in the pile weave case member 20 and hence, the carbon coat on the grain pieces may be prevented from adhering to one another or from being separated by the adhesive. Thus, the single-layered acoustic equipment mat having excellent characteristics may be formed quite easily.

When disposed under the speaker such as housed in a wooden casing or an acoustic equipment housed in a casing formed from a synthetic resin typically exemplified by plastics, the carbon-coated mat for acoustic equipment, such as the acoustic equipment mate 1c, may provide a similar effect to improve the acoustic characteristic of the acoustic equipment. The wood has a sound propagation speed of 4700 m/s and the plastic has a sound propagation speed of 1950 m/s. These sound propagation speeds are lower than the aforesaid sound propagation speed of silica gel or 5720 m/s. When used with these acoustic equipment, the carbon-coated mat does not provide such a great effect as when used with the acoustic equipment housed in the metal casing. Rather, the following problem may occur when the acoustic equipment mat 1c is disposed under these acoustic equipment having the low vibration propagation speeds. That is, the vibrations are detrimentally reflected by a reflective surface (equivalent to the aforesaid vibration exit surface) defined between the coat 9 and the silica gel 8.

The acoustic equipment mats 1b, 1c were subjected to an auditory test. It was auditorily confirmed that the acoustic equipment mat 1b free from the carbon coat is more excellent than the acoustic equipment mat 1c, when used as the mat to be disposed under the wooden casing of the speaker or the like and under the acoustic equipment housed in the plastic casing.

Seventh Embodiment

Next, a seventh embodiment illustrating another example wherein the silica-gel grain pieces are coated with the carbon coat (equivalent to the tenth aspect hereof) is described with reference to FIG. 23 and FIG. 24.

Figure 23:
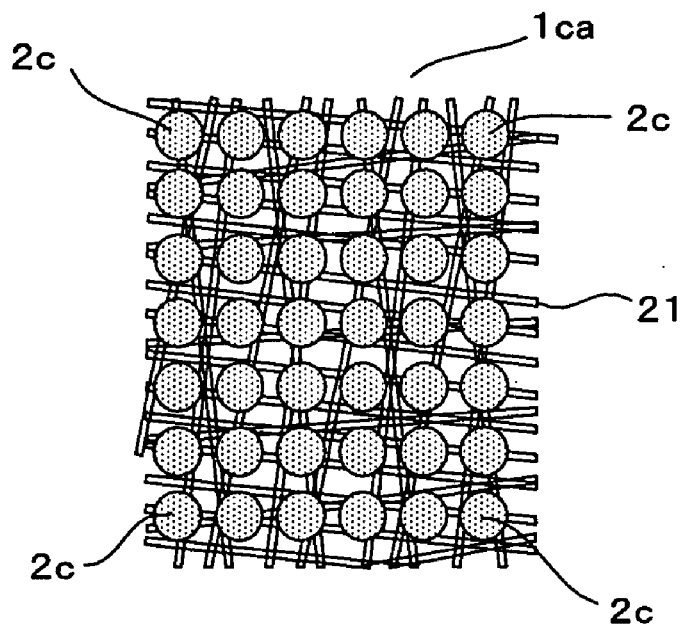
FIG. 23 is a plan view showing an acoustic equipment mat according to a seventh embodiment of the invention.
Figure 24:
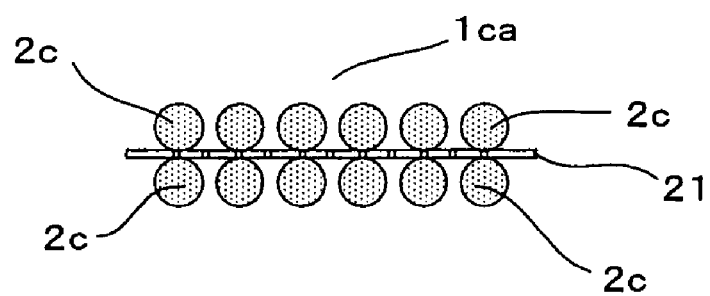
FIG. 24 is a front view of the mat shown in FIG. 23.

FIG. 23 is a plan view of a mat similar to that of FIG. 20 and FIG. 24 is a front view of the mat shown in FIG. 23. A feature of an acoustic equipment mat 1ca according to this embodiment consists in that the flexible thin-film support substrate is constituted by the meshed double-sided tape 21 of the fifth embodiment instead of the double-sided tape 7 of the acoustic equipment mat 1c of the sixth embodiment.

Therefore, the acoustic equipment mat 1ca of this embodiment is constituted to reduce the influence of the double-sided tape 21 much more than the acoustic equipment mat 1c of the sixth embodiment. The whole body of the mat 1ca is increased in the vibration dissipation speed for providing a more smooth reproduction of the high-frequency sound components, thus achieving a further increased effect to improve the acoustic characteristic of the acoustic equipment. As a result, the acoustic equipment mat 1ca is provided which has more excellent characteristics than the acoustic equipment mat 1c.

Measurement Results

Next, the results of measurement taken using the acoustic equipment mats 1b, 1c are described with reference to FIG. 25 to FIG. 30. Referring to FIG. 31 to FIG. 43, description is made on the results of measurement taken using the double-layered acoustic equipment mats 1ba, 1ca and the results of measurement taken using the single-layered acoustic equipment mats 1aa, 1ca. It is noted that the grain pieces 2a of the acoustic equipment mat 1aa were coated with the carbon coat because the mat was disposed under the amplifier or the like.

(1) Results of Measurement Taken Using Acoustic Equipment Mats 1b, 1c.

First, a measurement system is described with reference to FIG. 25 and FIG. 26.

Figure 25:
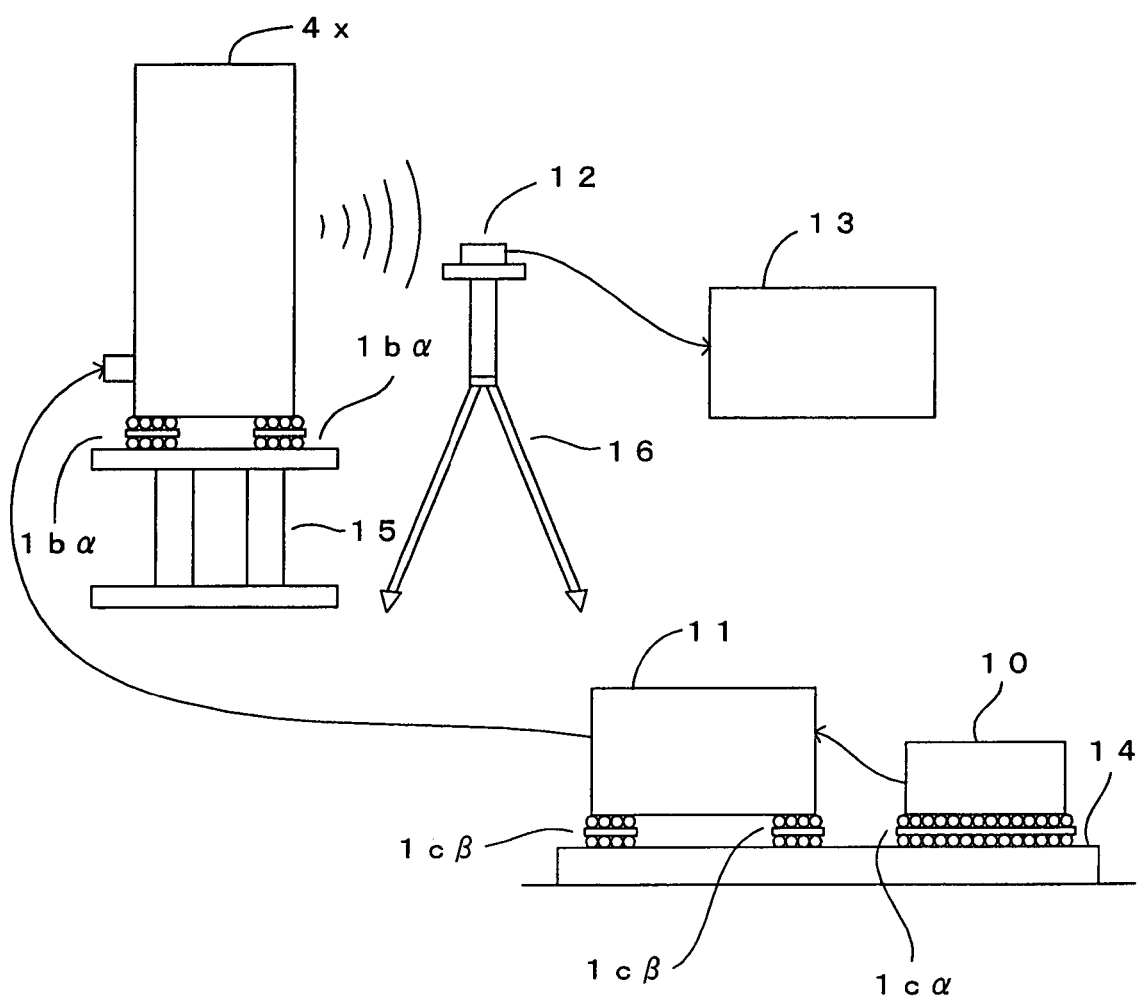
FIG. 25 is a diagram explanatory of an arrangement of one exemplary measurement/characterization system.

FIG. 25 shows an arrangement of the measurement system. The measurement system includes: an audio apparatus as a measurement subject which outputs a sample sound from a speaker 4x, the sample sound reproduced by an MD player 10 and amplified by an amplifier 11; and measuring instrument which captures the sound output from the speaker into a waveform analyzer 13 via a microphone 12 for analyzing the waveform of the reproduced sound by means of the analyzer 13.

The MD player 10 is set on a table 14 as resting on a 10 cm×8 cm black mat for acoustic equipment 1cα (hereinafter, referred to as "B-mat") which is disposed under the overall bottom surface of the player. The B-mat is formed by arranging two 5 cm×8 cm black acoustic equipment mats 1c in juxtaposition, the mats provided with the carbon coat.

The amplifier 11 is set on the table 14 as resting on 5 cm×5 cm B-mats 1cβ which are disposed under the feet at the four corners of a bottom of the amplifier. The B-mat 1cβ is constituted by the acoustic equipment mat 1c.

The speaker 4x is a 35 cm, 2-way speaker commercially available from Rogers Inc. under a model number PM510. The speaker is set on a speaker stand 15 as resting on 5 cm×5 cm white acoustic equipment mats 1bα (hereinafter, referred to as "W-mat") which are disposed under the four corners of a bottom of the speaker. The W-mat is constituted by the acoustic equipment mat 1b free from the carbon coat.

The microphone 12 is placed at a proper position forwardly of the speaker 4x, as set on a microphone stand 16.

Figure 26:
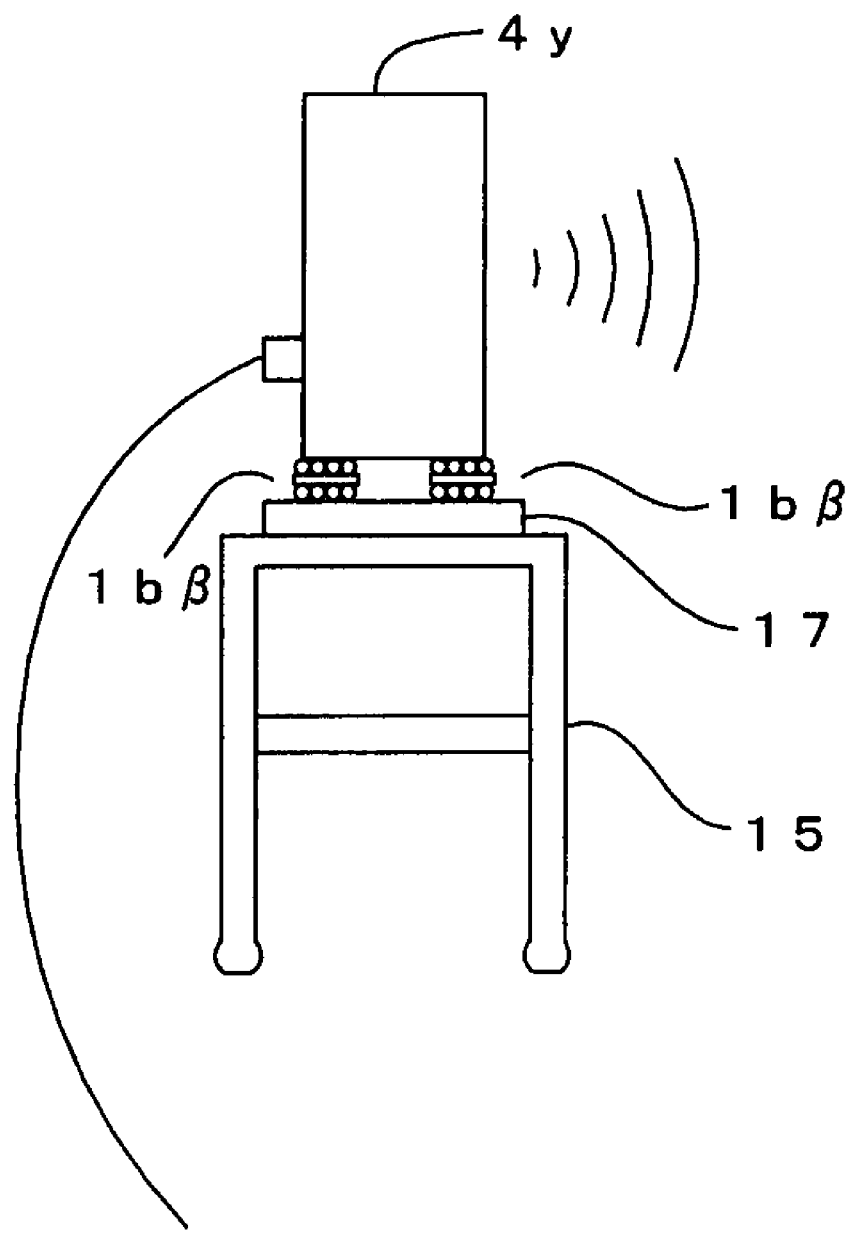
FIG. 26 is a diagram explanatory of another exemplary speaker used in the system shown in FIG. 25.

FIG. 26 shows a speaker 4y which is subjected to the measurement in place of the speaker 4x shown in FIG. 25. The speaker is a 12 cm, 2-way speaker commercially available from Rogers Inc. under a model number LS3•5A. The speaker is set on an artificial marble plate 17 on the speaker stand 15 as resting on 1.5 cm×1.5 cm W-mats 1bβ which are disposed under the four corners of a bottom of the speaker.

The W-mats 1bα, 1bβ are formed by attaching B-type silica-gel grains to the both sides of a transparent double-sided tape having a thickness on the order of tens micrometers. The B-type silica-gel grains are used in commercially available demoisturizers and the like. The double-sided tape is formed by coating the both sides of a polypropylene film with an acrylic adhesive. The B-mats 1cα, 1cβ are formed using silica-gel grains obtained by coating the silica-gel grains of the W-mats 1bα, 1bβ with carbon microparticles used in commercially available aromatic deodorizers.

Next, description is made on a measurement procedure and measurement results.

The audio system including the speaker 4x of FIG. 25 was tested as follows, in each of a mat-equipped state where the acoustic equipment mats 1bα, 1cα, 1cβ were provided and a mat-free state wherein the mats 1bα, 1cα, 1cβ were dispensed with. In each of the above state, an MD recording repeated tone bursts having a frequency of 5000 Hz and duration of 250 ms was played on the MD player 10. The reproduced tone bursts were outputted from the speaker 4x via the amplifier 11 and were captured into the waveform analyzer 13 via the microphone 12. The waveforms of the output sound from the speaker 4x were analyzed by means of waveform analysis software installed in a computer of the analyzer 13. The results are shown in FIG. 27 and FIG. 28.

The same measurement test as the above was conducted using the speaker 4y of FIG. 26 in place of the speaker 4x of FIG. 25. The results are shown in FIG. 29 and FIG. 30.

Figure 27:
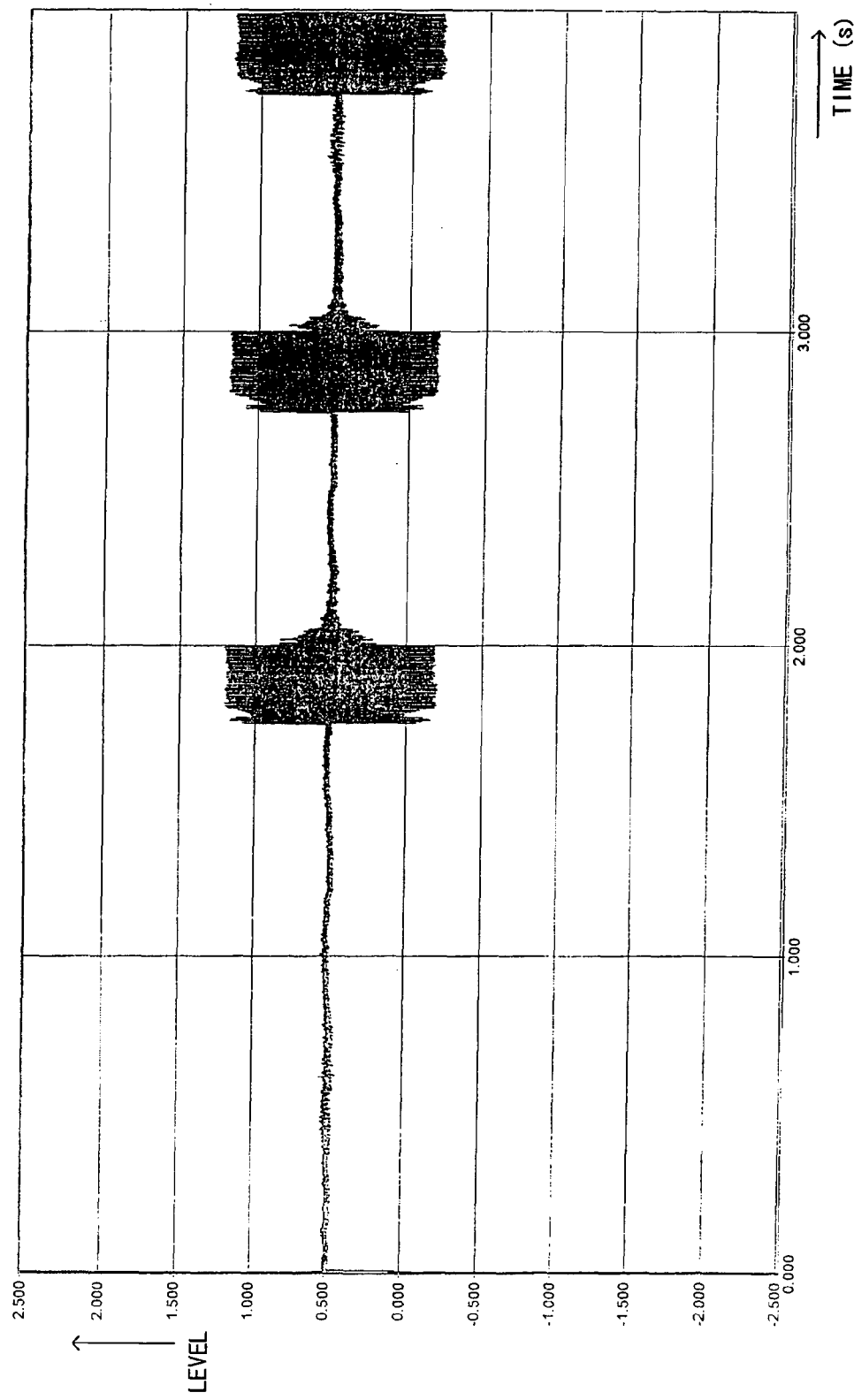
FIG. 27 is a characteristic graph showing measurement results.
Figure 28:
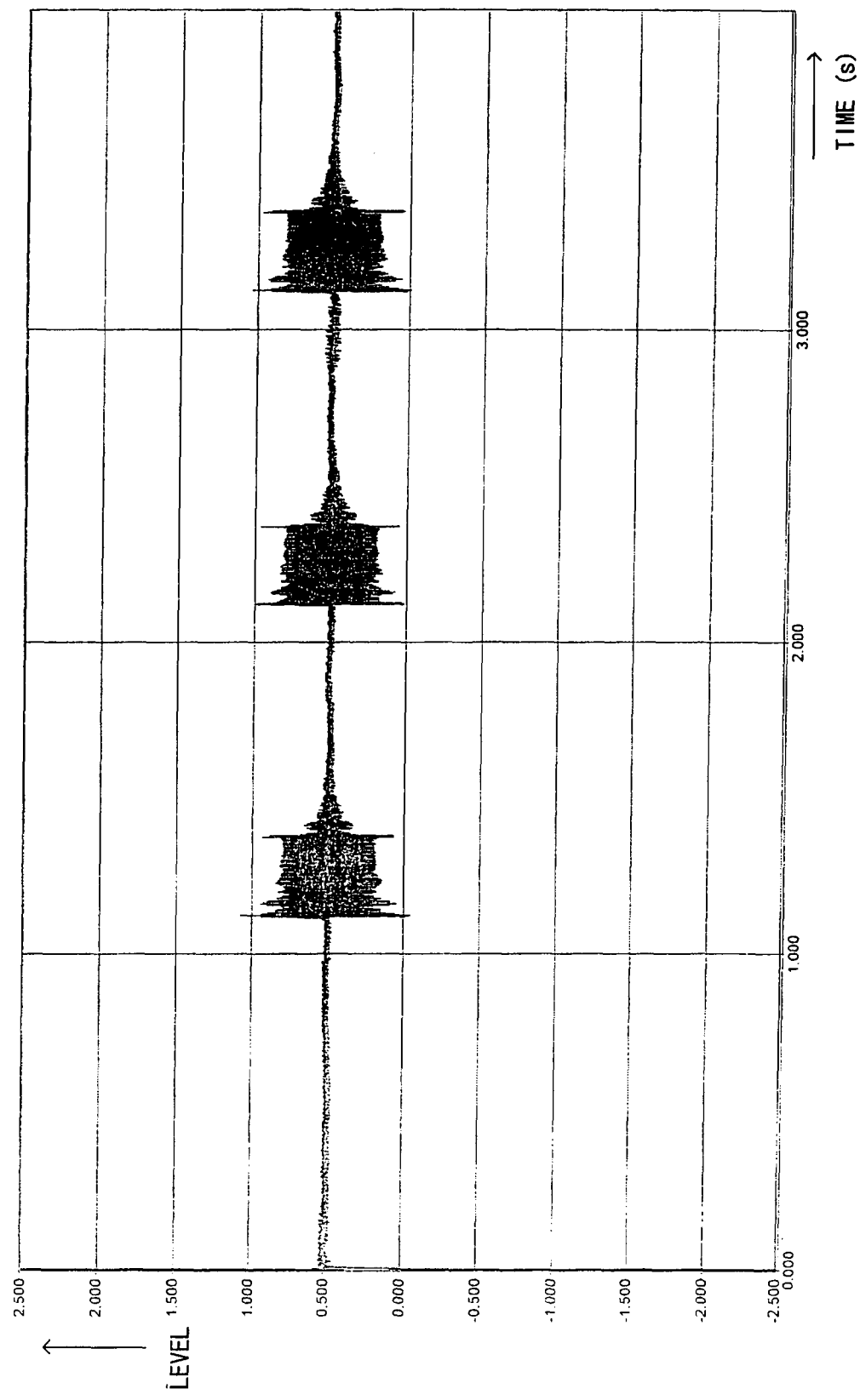
FIG. 28 is a characteristic graph showing measurement results.
Figure 29:
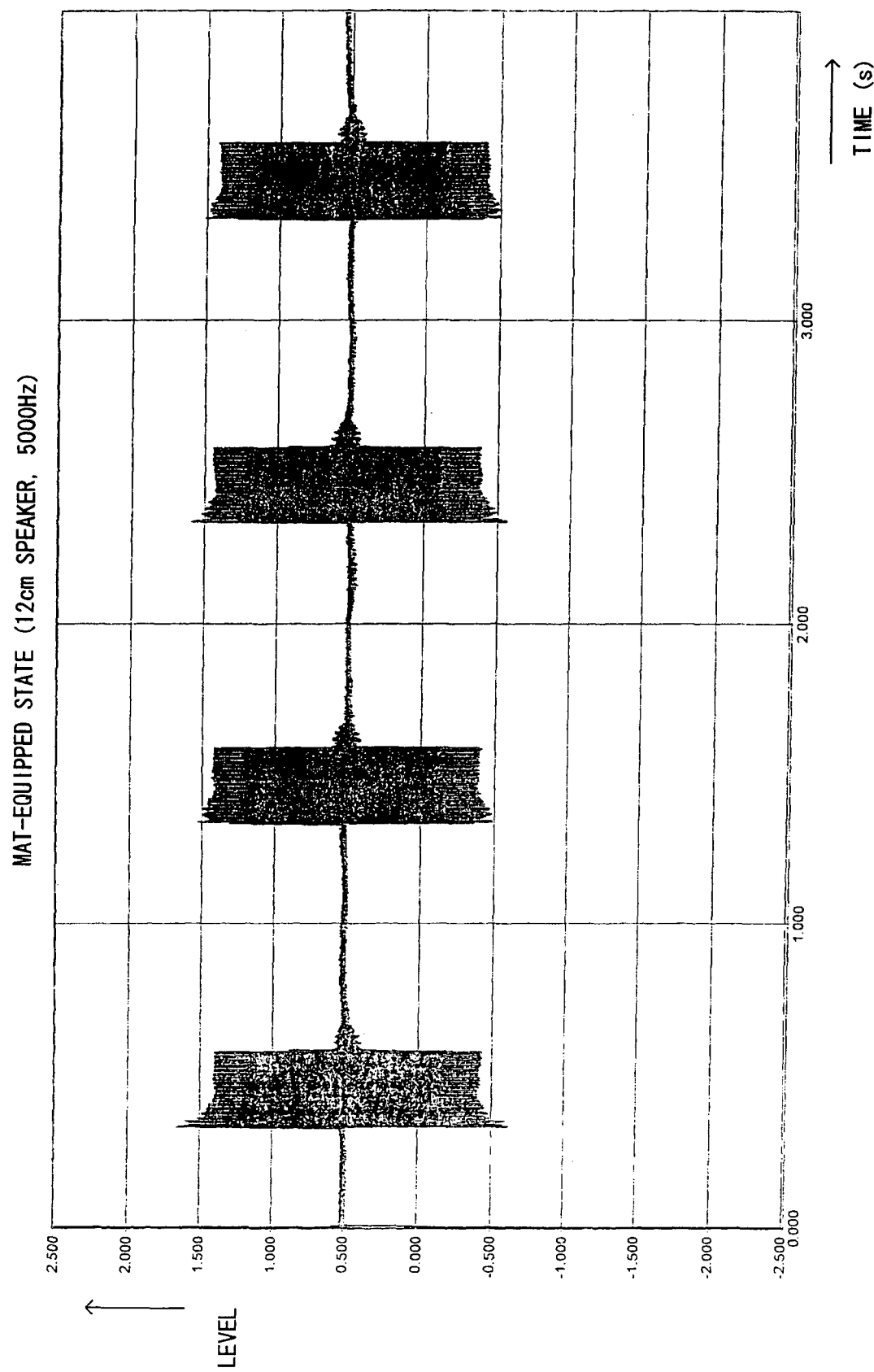
FIG. 29 is a characteristic graph showing measurement results.
Figure 30:
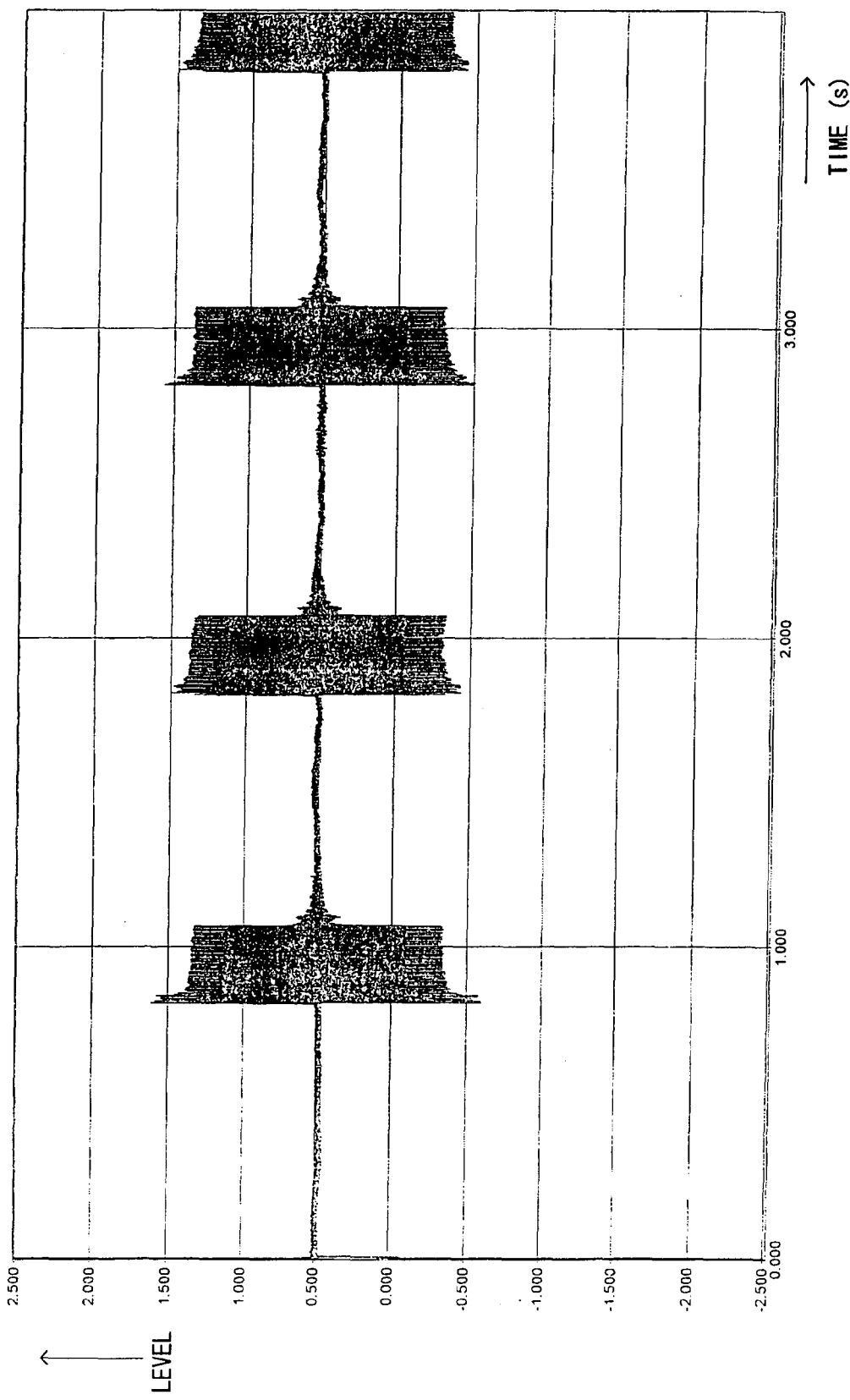
FIG. 30 is a characteristic graph showing measurement results.

In FIG. 27 to FIG. 30, the abscissa is the time (s) and the ordinate is the relative level. As indicated by these measurement graphs, the speakers in the mat-equipped state of FIG. 27, FIG. 29 present shorter aftersounds representing unwanted vibrations at burst ends as compared with the speakers in the mat-free state of FIG. 28, FIG. 30. It is thus confirmed that the speakers in the mat-equipped state are improved in the acoustic characteristic, reproducing the recorded burst sounds with increased fidelity.

(2) Results of Measurement Taken Using Double-Layered Acoustic Equipment Mats 1ba, 1ca and Single-Layered Acoustic Equipment Mats 1aa, 1ca First, description is made on a measurement system. A large speaker system was composed according to the arrangement shown in FIG. 25 using the 35 cm, 2-way speaker 4x. A small speaker system was composed according to the arrangement shown in FIG. 25, wherein the speaker 4x was constituted by a 20 cm, 2-way speaker commercially available from Rogers Inc. under a model number LS5/9A (hereinafter, referred to as "20 cm speaker") instead of the 12 cm, 2-way speaker 4y shown in FIG. 26.

The measurement test was conducted in each of (i) the mat-free state wherein the acoustic equipment mat is dispensed with; (ii) a mat-equipped state wherein meshed B-mats constituted by the acoustic equipment mats 1ca were disposed under the MD player 10 and the amplifier 11, while a meshed W-mats constituted by the acoustic equipment mats 1ba were disposed under the speaker 4x (hereinafter, referred to as "double-layered-mat equipped state"); and (iii) a mat-equipped state wherein single-layered B-mats were disposed under the MD player 10 and the amplifier 11, the B-mat constituted by the acoustic equipment mat 1aa having the grain pieces 2a replaced by the carbon-coated grain pieces, while single-layered W-mats were disposed under the speaker 4x (hereinafter, referred to as "single-layered-mat equipped state").

Similarly to the above test, the MD player 10 was operated to reproduce respective tone bursts having frequencies of 50 Hz, 200 Hz, 1000 Hz and 5000 Hz, while the sounds outputted from the speaker 4x via the amplifier 11 were captured into the waveform analyzer 13 via the microphone 12.

Figure 31:
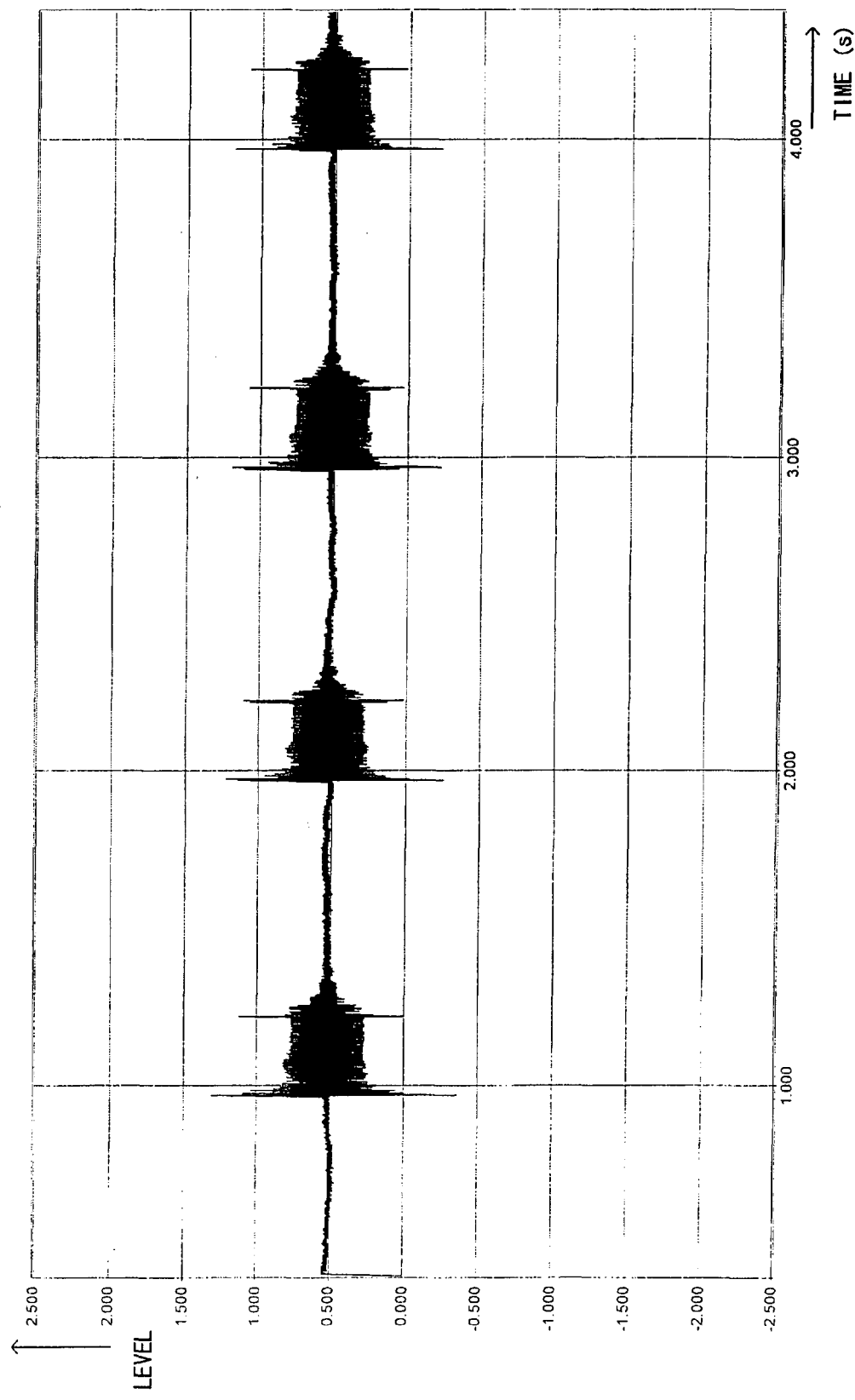
FIG. 31 is a characteristic graph showing measurement results.
Figure 32:
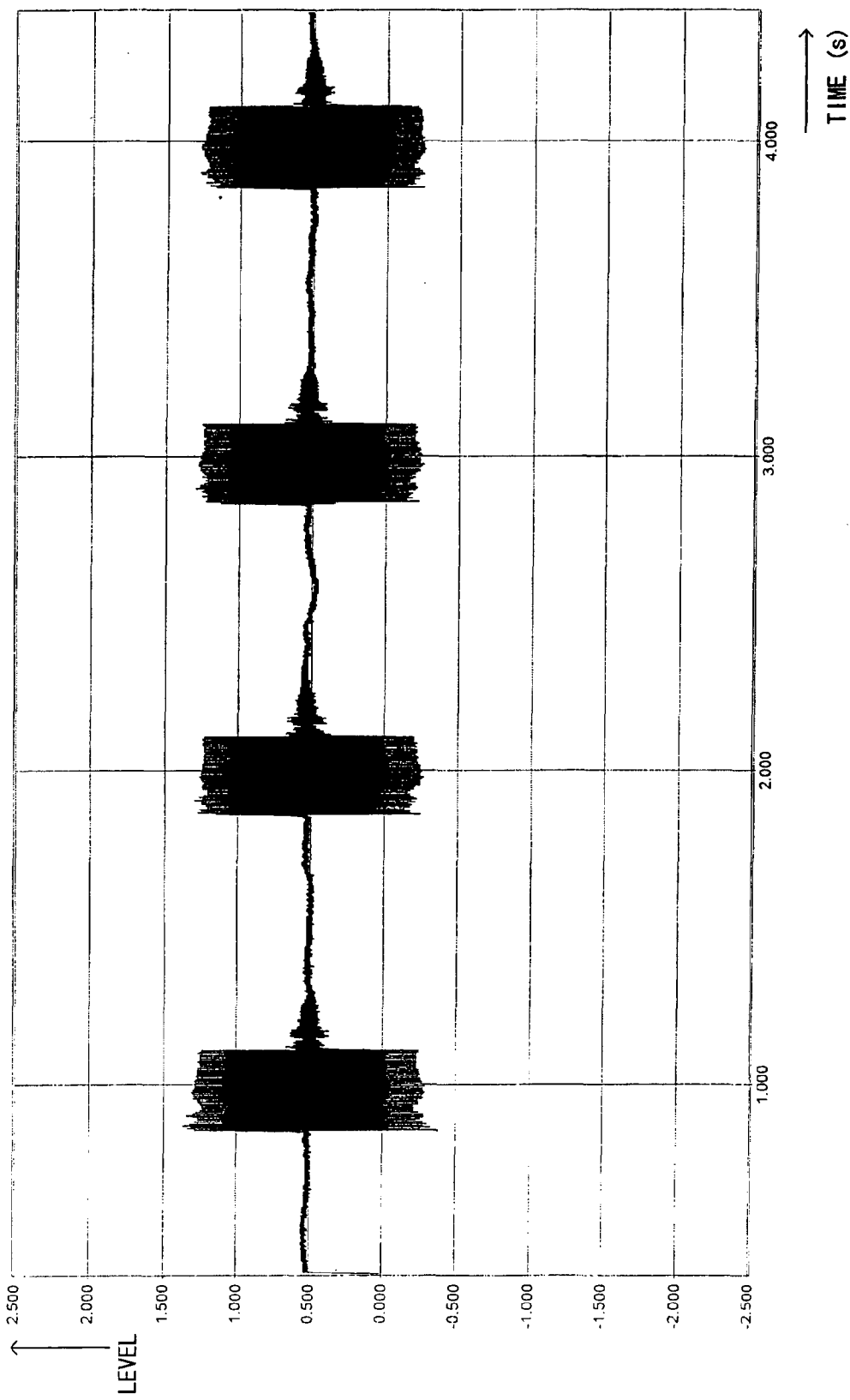
FIG. 32 is a characteristic graph showing measurement results.
Figure 33:
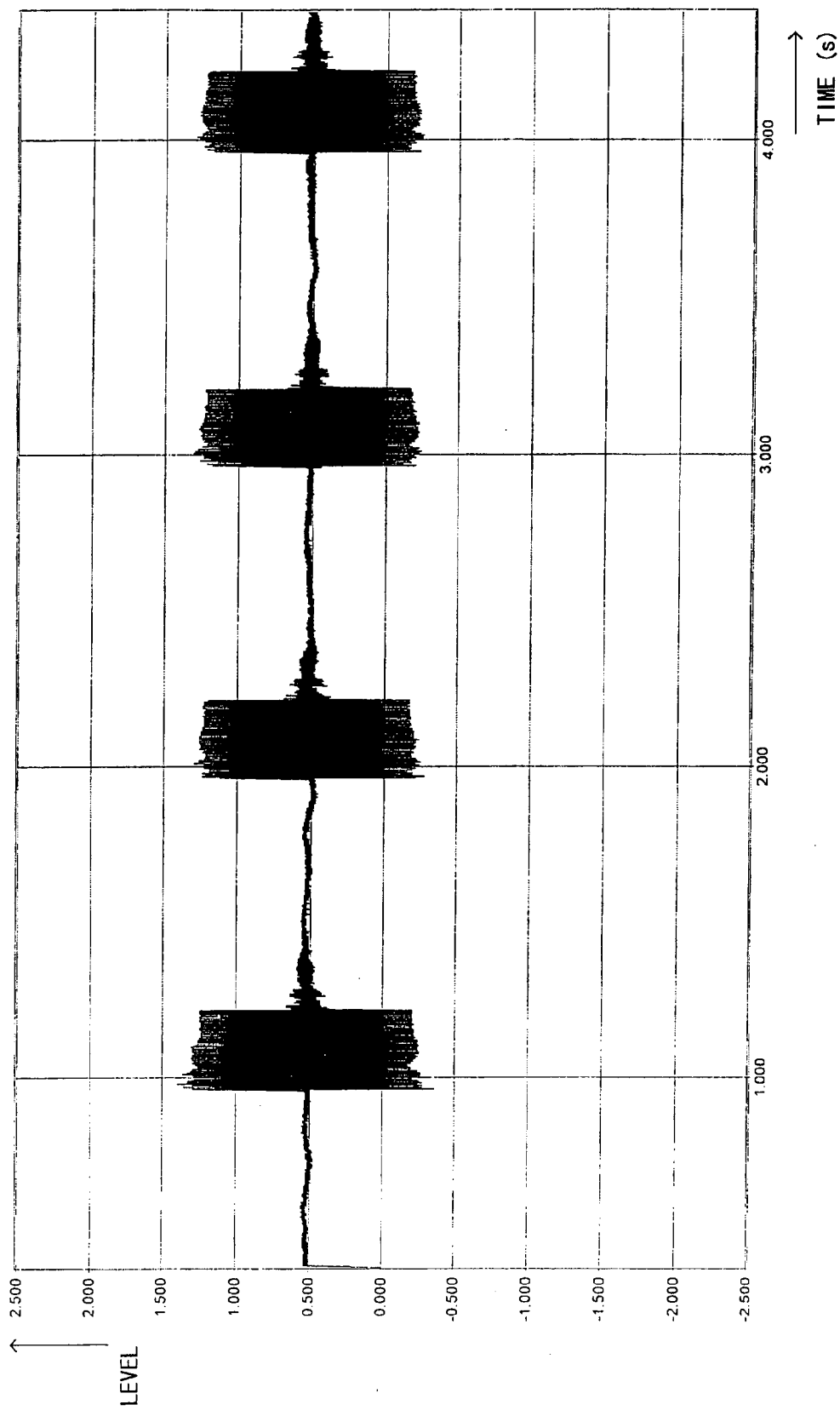
FIG. 33 is a characteristic graph showing measurement results.
Figure 34:
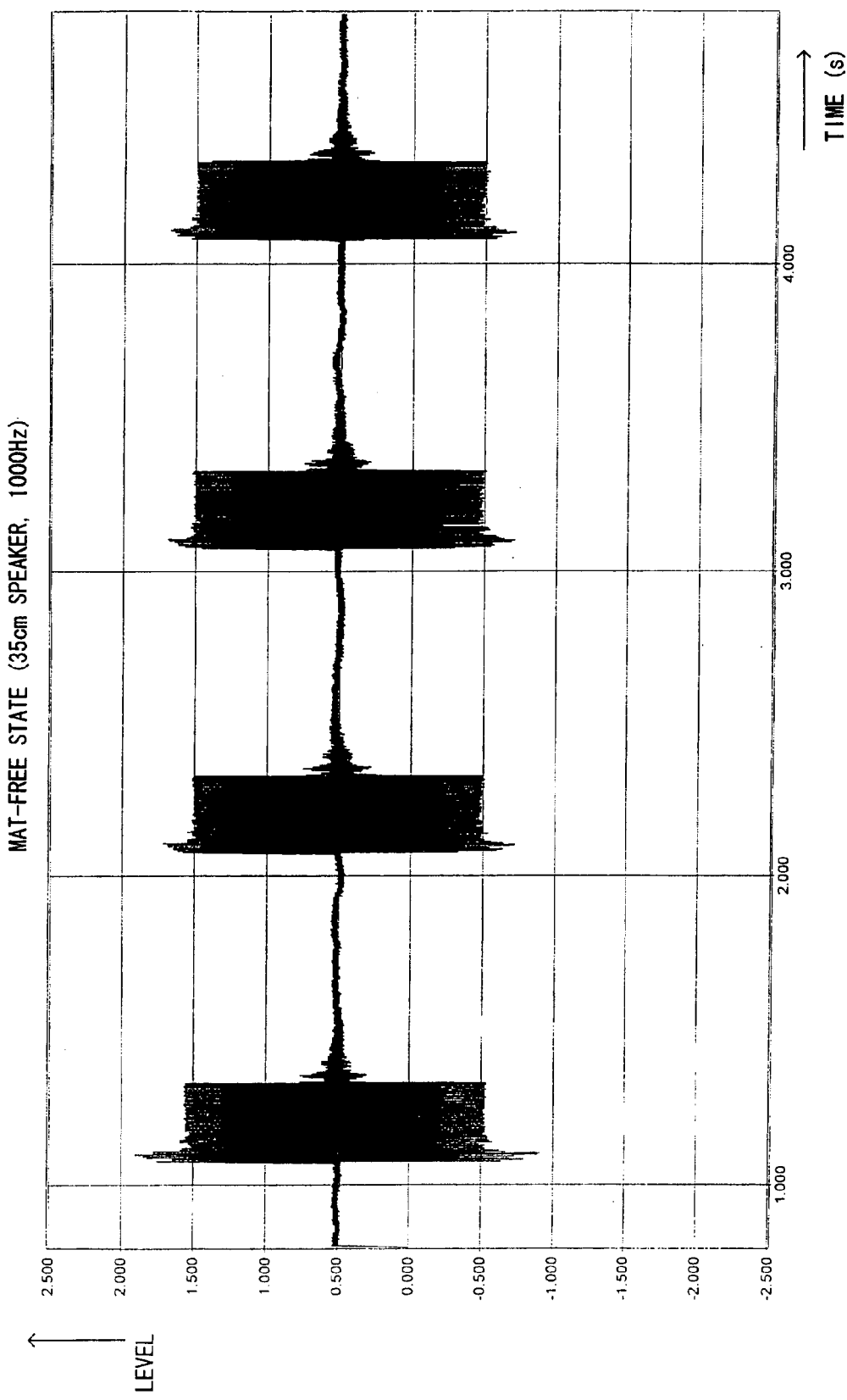
FIG. 34 is a characteristic graph showing measurement results.
Figure 35:
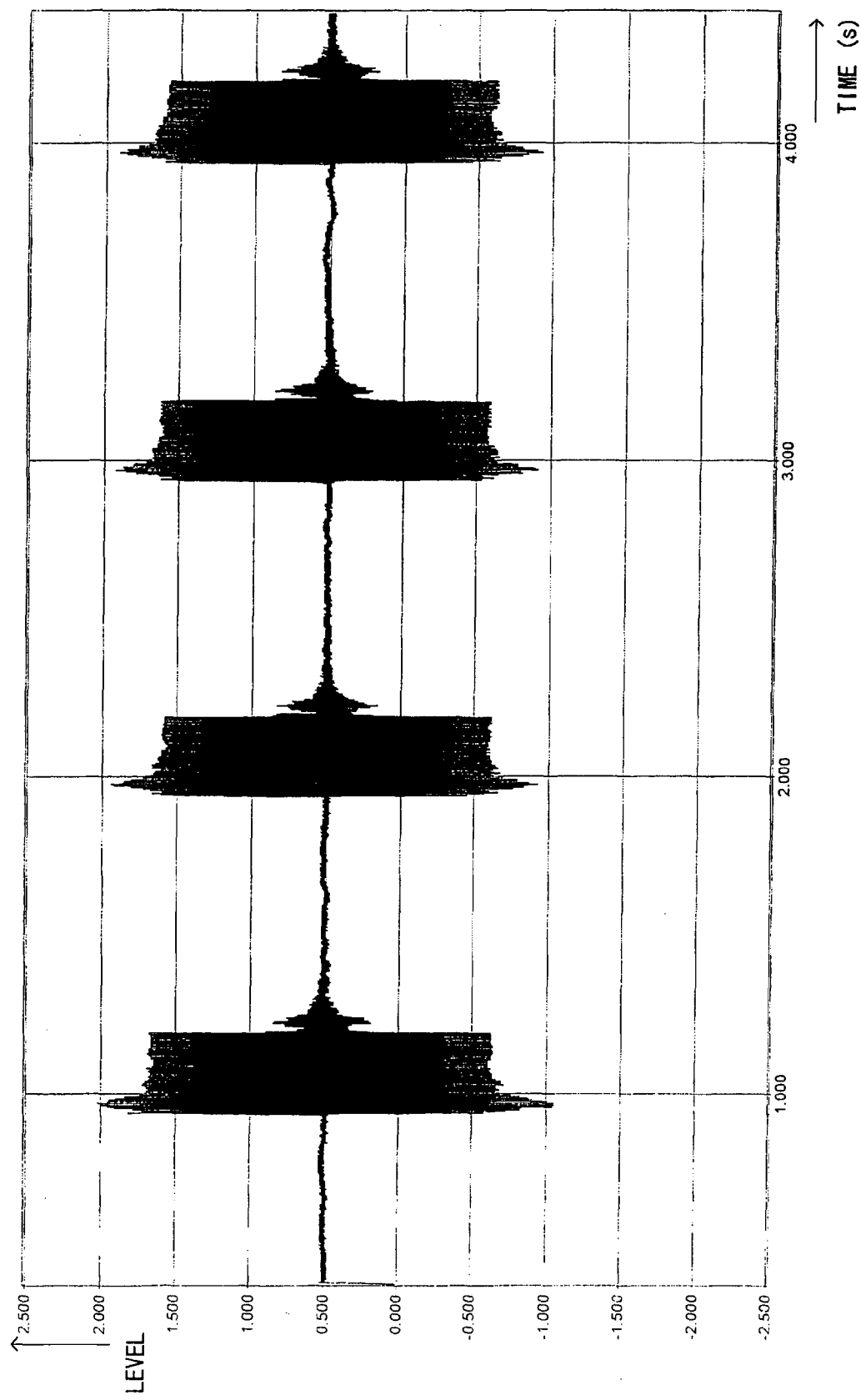
FIG. 35 is a characteristic graph showing measurement results.
Figure 36:
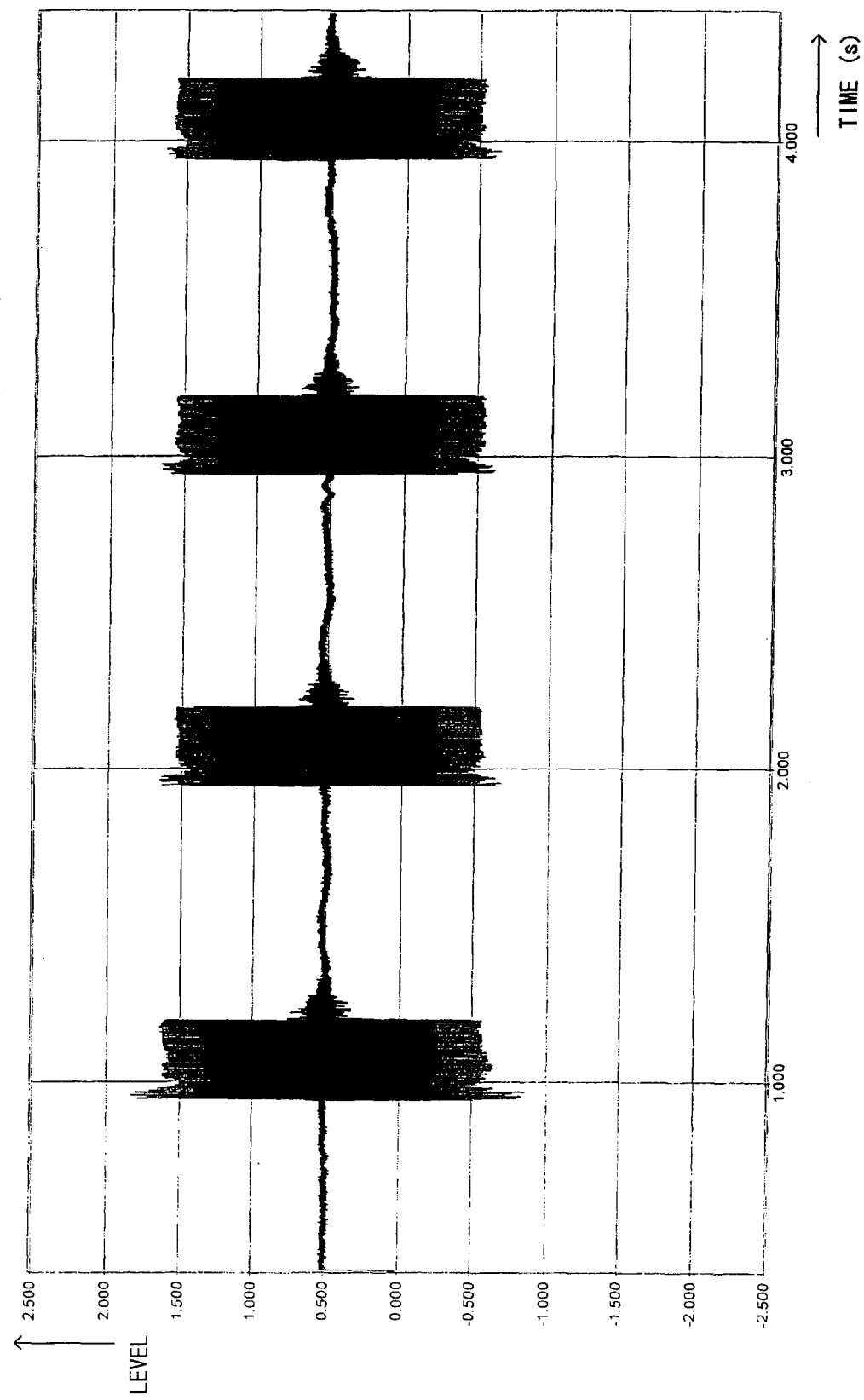
FIG. 36 is a characteristic graph showing measurement results.
Figure 37:
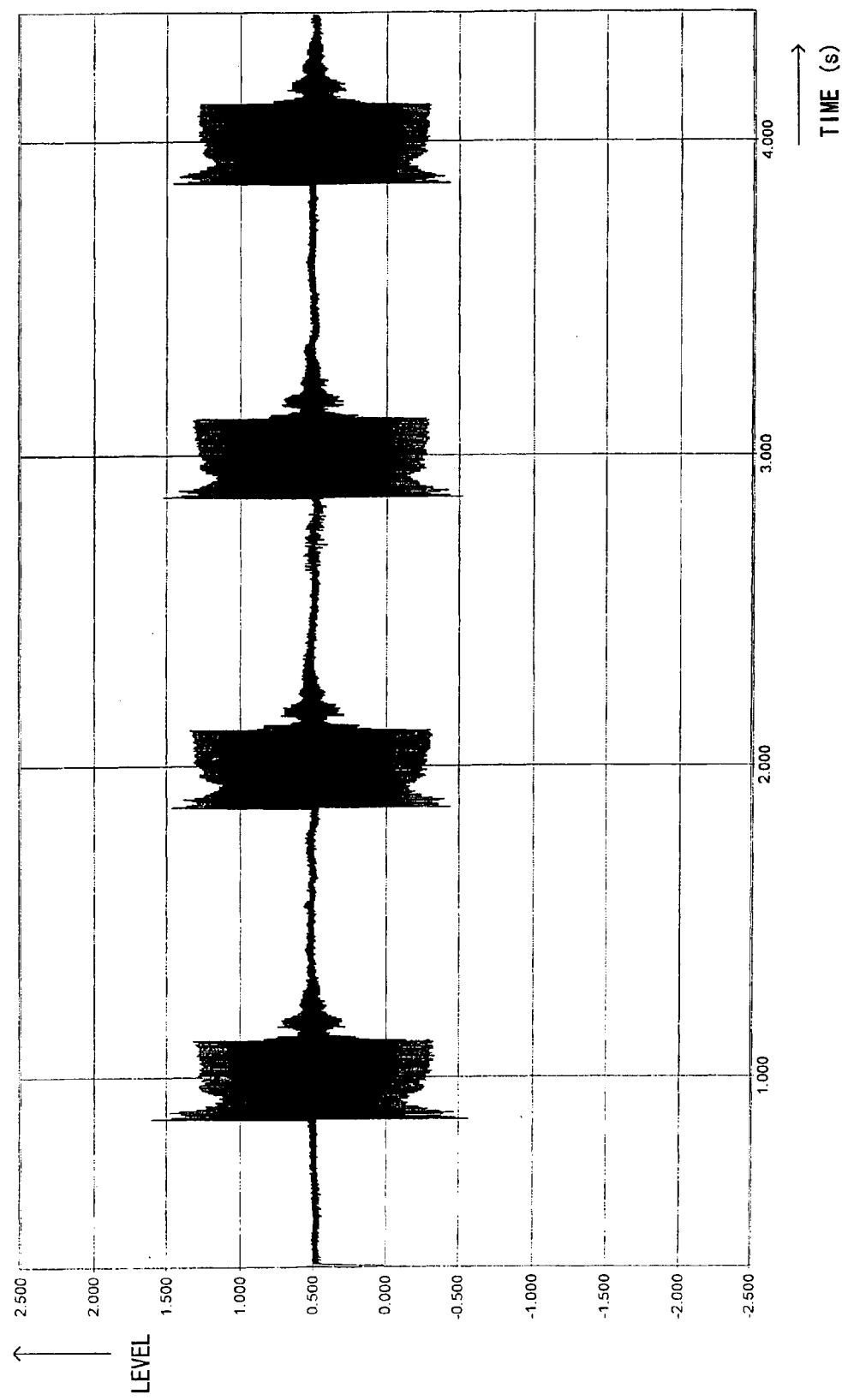
FIG. 37 is a characteristic graph showing measurement results.
Figure 38:
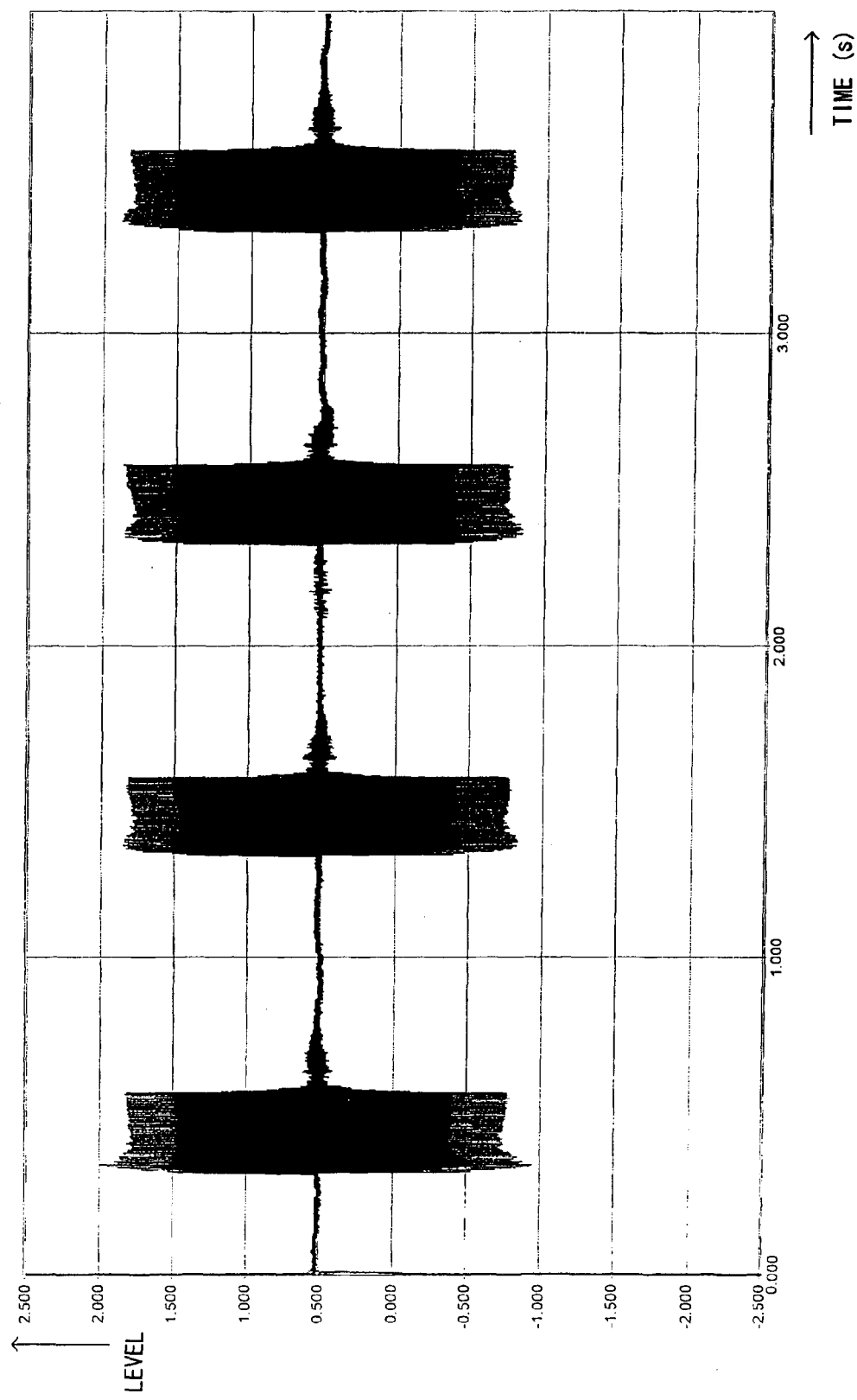
FIG. 38 is a characteristic graph showing measurement results.
Figure 39:
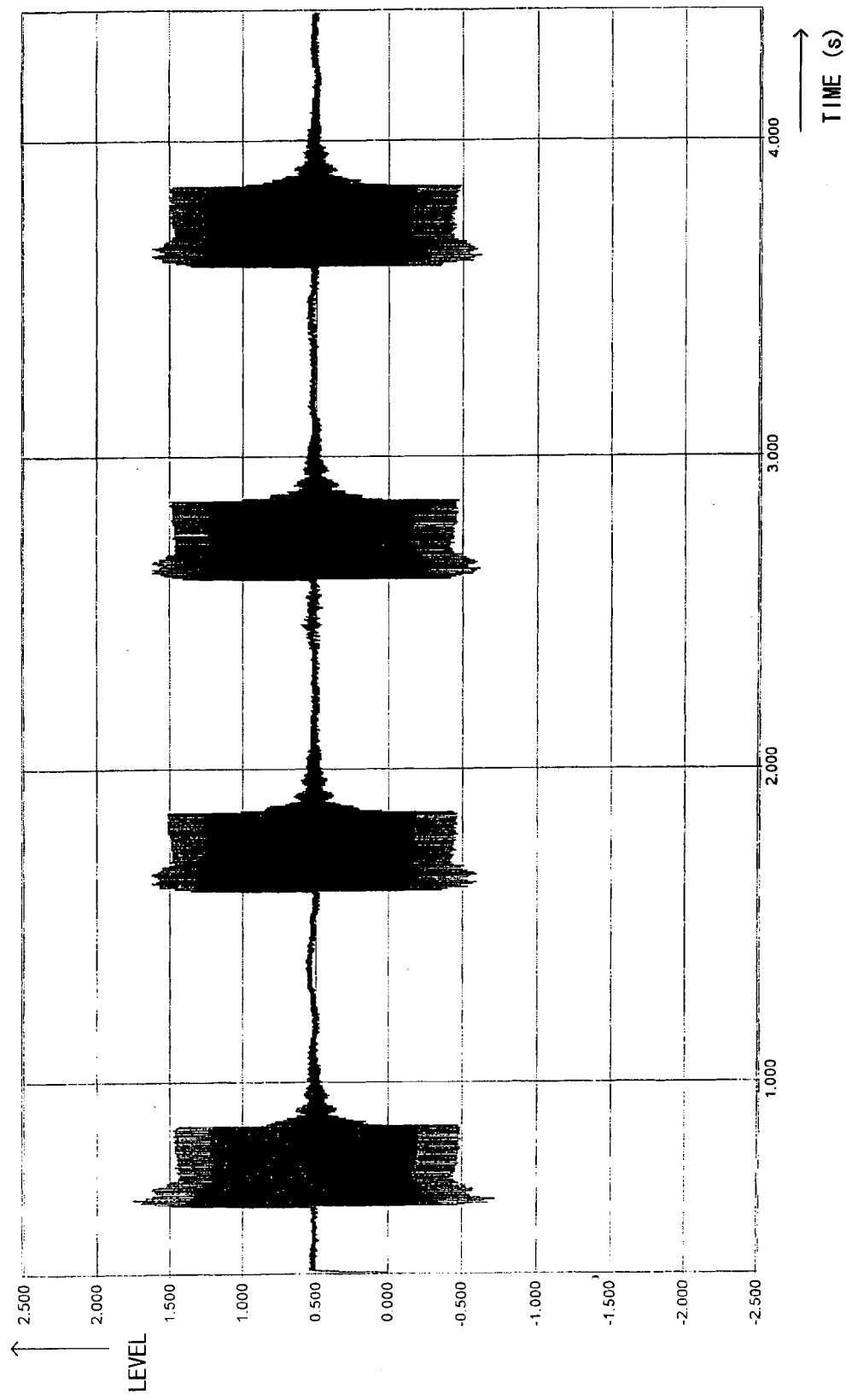
FIG. 39 is a characteristic graph showing measurement results.
Figure 40:
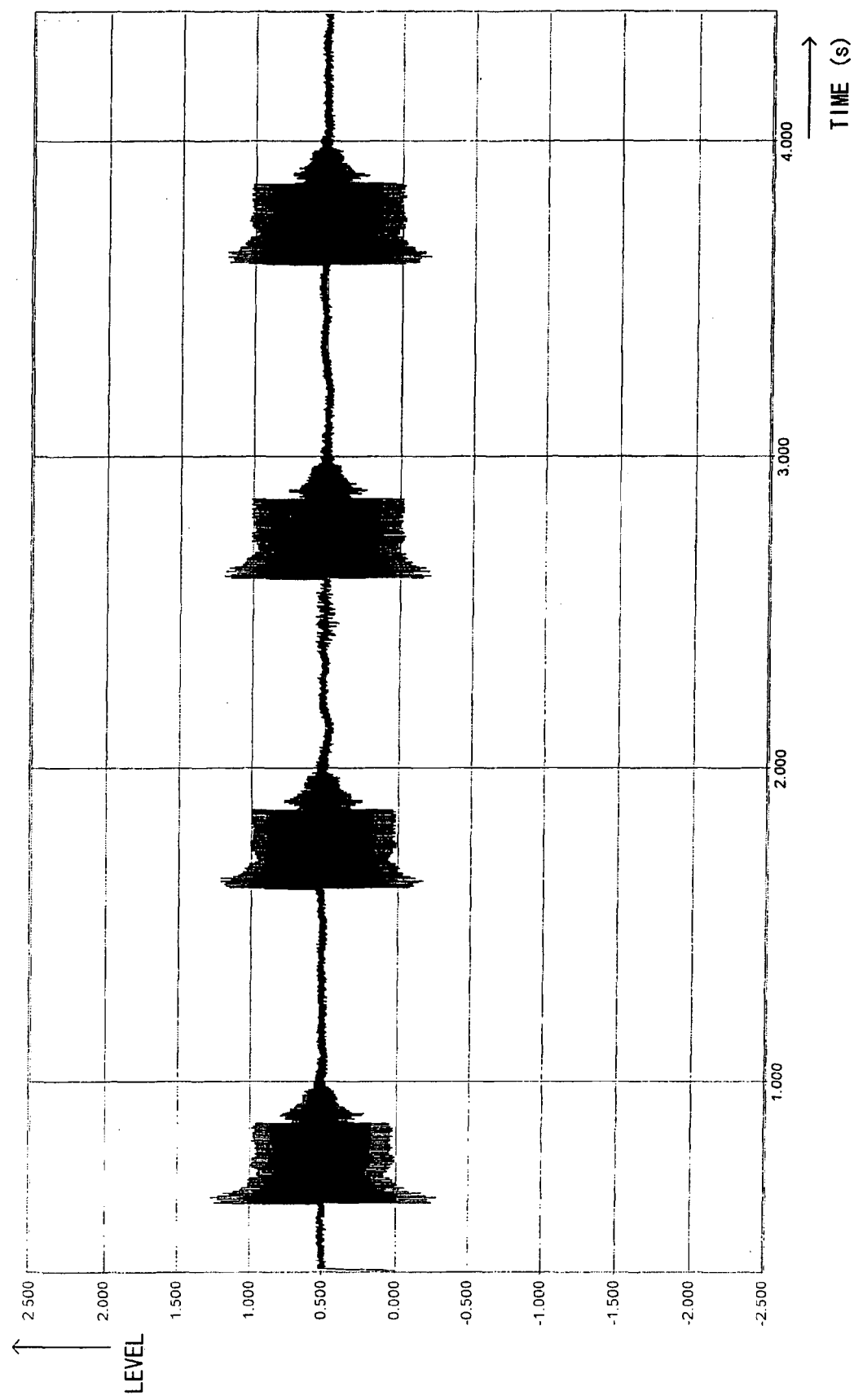
FIG. 40 is a characteristic graph showing measurement results.
Figure 41:
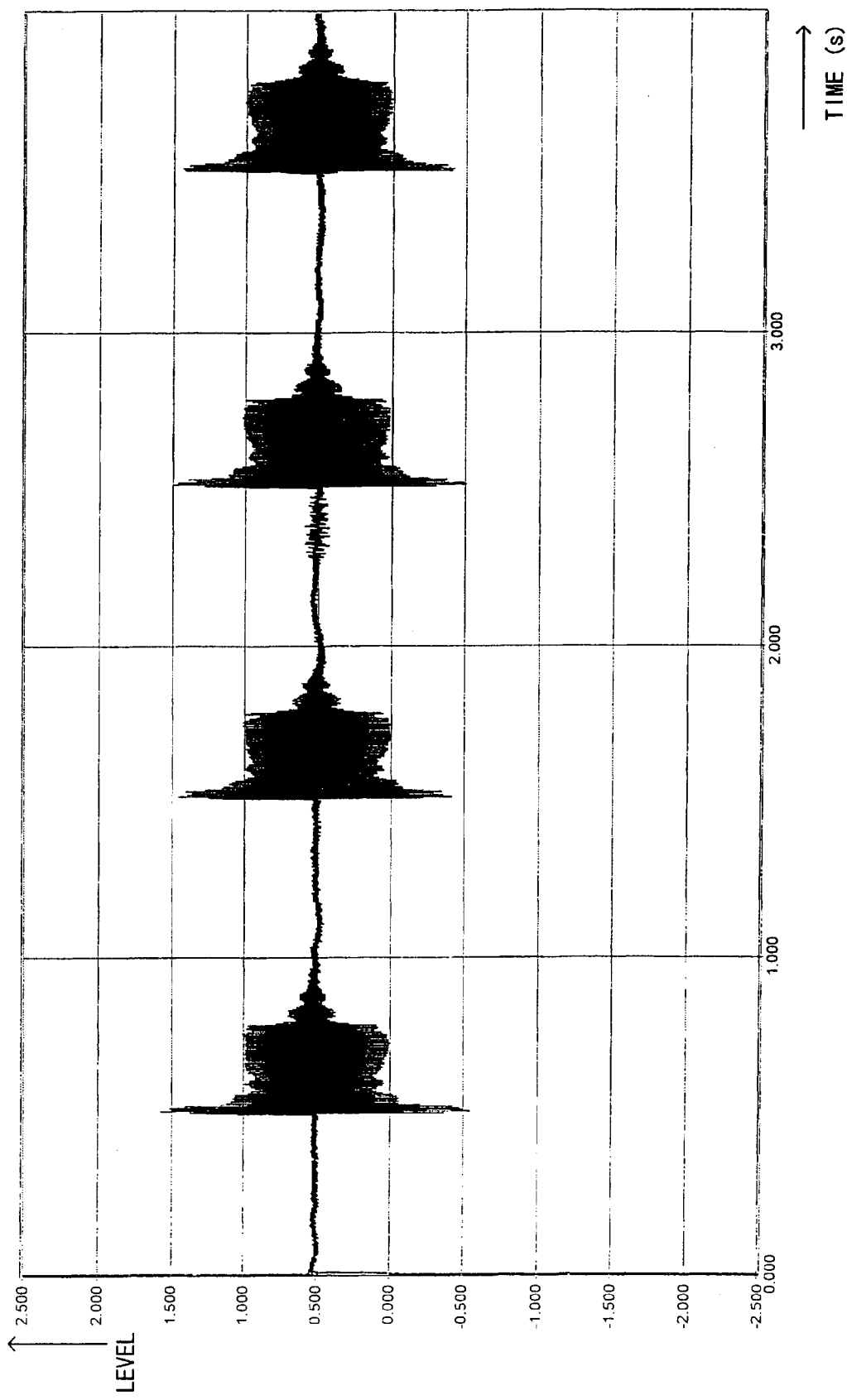
FIG. 41 is a characteristic graph showing measurement results.
Figure 42:
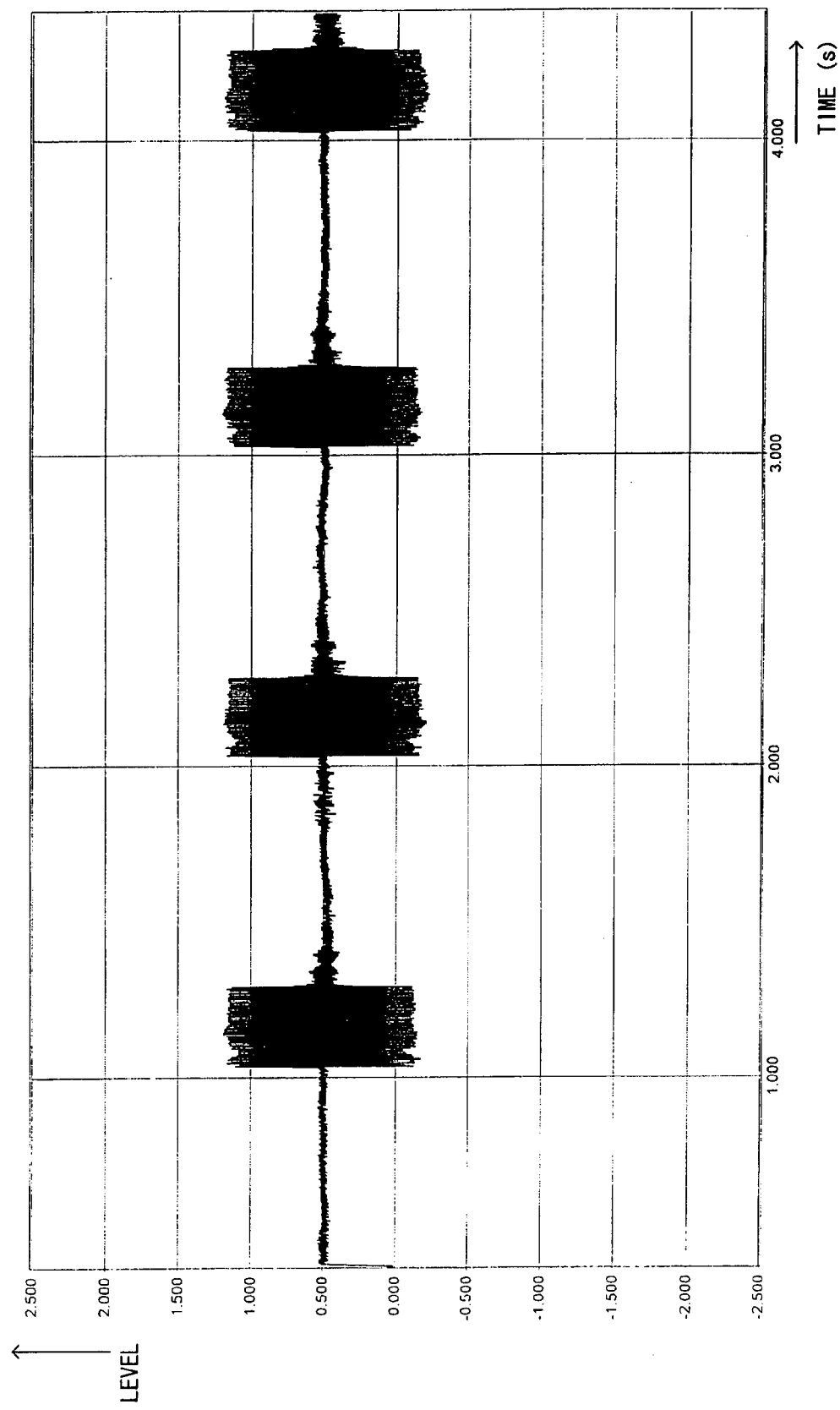
FIG. 42 is a characteristic graph showing measurement results.

The measurement results with respect to the tone bursts of 1000 Hz, for example, are shown in FIG. 31 to FIG. 37. The measurement results with respect to the tone bursts of 5000 Hz are shown in FIG. 38 to FIG. 42. FIG. 31, FIG. 32 and FIG. 33 show the results of the tone bursts of 1000 Hz outputted from the 20 cm speaker in the mat-free state, the double-layered-mat equipped state and the single-layered-mat equipped state, respectively. FIG. 34, FIG. 35 and FIG. 36 show the results of the tone bursts of 1000 Hz outputted from the 35 cm speaker in the respective states. FIG. 37, FIG. 38 and FIG. 39 show the results of the tone bursts of 5000 Hz outputted from the cm speaker in the respective states. FIG. 40, FIG. 41 and FIG. 42 show the results of the tone bursts of 5000 Hz outputted from the 35 cm speaker in the respective states.

It is noted that these measurement tests were conducted in a different time of year from that when the above test using the acoustic equipment mats 1b, 1c was conducted. Hence, the measurement results involve differences associated with different measurement environments.

Figure 43:
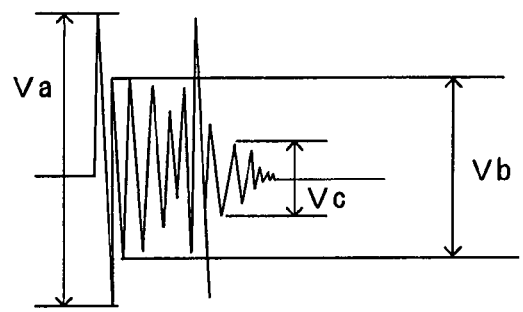
FIG. 43 is a graph explaining how to evaluate the measurement results.
Figure 44:
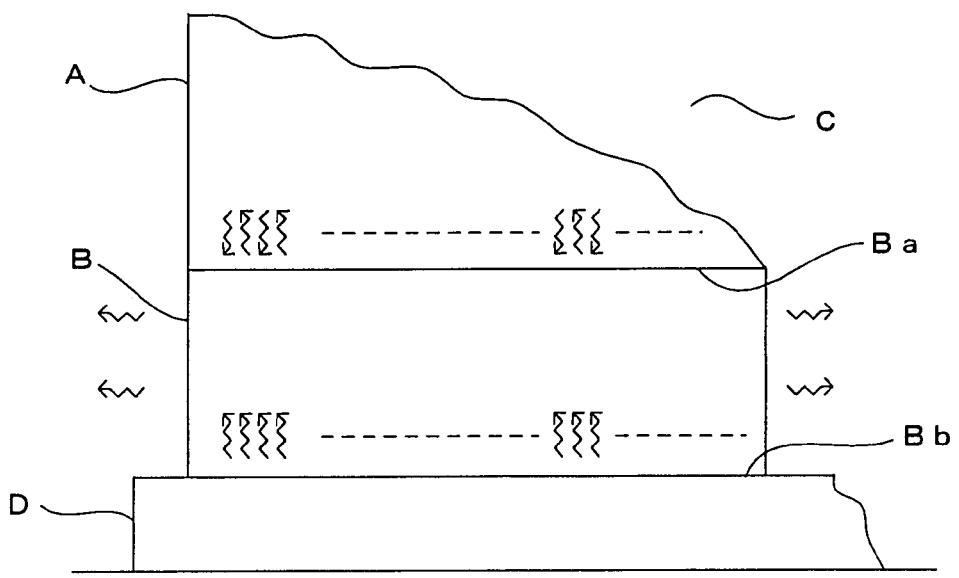
FIG. 44 is a diagram explaining an example of conventional vibration dissipation.

These measurement results were evaluated on three items including rising edge Va, amplification value Vb and reverberation value Vc shown in a waveform diagram of FIG. 43. It was determined that the use of the double-layered acoustic equipment mats 1ba, 1ca provides a greater effect than in the mat-free state, and that the use of the single-layered acoustic equipment mats 1aa, 1ab provides an even greater effect. An output sound having an excessively greater rising edge Va than the other waveform portion receives a low evaluation because the output sound has a specific "sounding characteristic (sound behavior)". An acoustic characteristic having the greater amplification value Vb receives the higher evaluation because the greater amplification value provides the sound reproduction in the greater volume. An acoustic characteristic having the smaller reverberation value Vc and the shorter fadeout time receives the higher evaluation because such a characteristic provides the sound reproduction in the smaller volume.

In a case where the acoustic equipment mats are applied to a system including plural acoustic equipment, the following problem may be encountered if the same type of mats (single-layered or double-layered) including the carbon-coated grain pieces are disposed at a region where casings formed from the same metal material and in the same thickness are serially interconnected via wire. For example, if the metal casings of a power section and an operation section in the system are serially interconnected via wire, resonance may occur and an "unclear" sound may result. Therefore, it is more preferred that different types of mats (single-layered and double-layered) including the carbon-coated grain pieces are disposed at such a region.

The carbon-coated grain pieces conduct electricity. In the use of the acoustic equipment mat 1ab including the carbon-coated gain pieces, in particular, it is crucial to take extra care to prevent every one of the grain pieces from falling off from the mat 1ab in the light of preventing electric/electronic circuits, such as of the amplifier, from being shorted out.

In other cases or particularly when the mat is used with the speaker, it is preferred to take care not to dispose any concaved or convexed article at any peripheral area of the speaker including a rear portion thereof because a condition of the rear portion of the speaker or the like also affects the reverberation characteristic.

In a case where this type of mat including the silica-gel grain pieces is disposed under a huge speaker having such a great weight, the grain pieces may cause the deformation of a wood plate constituting the bottom of the speaker. In such a case, small plate pieces, the deformation of which is allowed, may be interposed between the mat and the speaker thereby preventing the deformation of the speaker.

INDUSTRIAL APPLICABILITY

It is noted that the invention is not limited to the foregoing embodiments and various changes and modifications may be made thereto so long as such changes and modifications do not deviate from the scope of the invention. For instance, the invention is also applicable to a modification of the above single-layered acoustic equipment mat 1a, which uses a flexible adhesive resin material as the bonding medium 3 such as to provide gaps between the grain pieces 2a.

As a matter of course, the grain pieces 2a to 2c of the acoustic equipment mats 1a to 1ca may have such size variations or shape variations as acceptable as silica-gel products, although it is preferred that the grain pieces are uniformized in the grain size. It is preferred that the acoustic equipment mats 1a to 1c use as many grain pieces as possible for minimizing the gaps between the grain pieces, thereby increasing the vibration dissipation speed of the whole bodies of the mats. However, it is of course preferred to keep the adjoining grain pieces out of contact.

Furthermore, the invention is also applicable to modifications of the above single-layered acoustic equipment mats 1aa, 1ab, wherein the mesh substrate 18, the adhesive substrate 19 or the casing 20 are mesh sheets, adhesive thin-sheets or fiber materials in the a pile form, which are formed from various flexible materials.

In the above double-layered acoustic equipment mats 1b, 1ba, 1c, 1ca, the support substrates such as the double-sided tape 7 and the meshed tape 21 may be a variety of double-sided tapes, mesh tapes and the like which are thin and have a strong adhesive power. The invention is applicable no matter what material may constitute the support substrate.

The grain pieces 2a to 2c may preferably have the minimum grain size to prevent the initial single-layer or double-layer structure from being impaired when the support substrate is flexed. In practice, the grain size may preferably be in the aforesaid range of 1 mm to 10 mm. However, the invention is applicable to cases where the grain pieces 2a to 2c have various grain sizes other than those in the above range.

The aforementioned acoustic equipment mats 1a to 1c may be disposed under various types of acoustic equipment and are not limited in size or locations. The invention is applicable regardless of the size or location of the individual acoustic equipment mats.

What is claimed is:

1. An acoustic equipment vibration dissipating silica-gel grain mat, consisting of:
   a constituent medium comprising opposing surfaces; and
   a plurality of silica-gel grain pieces arranged in a single layer throughout said constituent medium, each of said grain pieces including peripheral surface portions, said peripheral surface portions extending above an adjacent surface portion of one of the constituent medium opposing surfaces so as to provide a vibration incident surface and below an adjacent surface portion of another of the constituent medium opposing surfaces so as to provide a vibration exit surface, said vibration incident and exit surfaces respectively forming direct contact surfaces for acoustic equipment and an acoustic equipment support surface.

2. The mat according to claim 1,
   wherein said grain pieces are positioned in adjoining relation and are bonded to each other at their peripheries through connection with the constituent medium.

3. The mat according to claim 1,
   wherein said grain pieces are arranged in a single layer in said constituent medium so that said grain pieces are sandwiched between said opposing surfaces of said constituent medium, said constituent medium comprising a flexible mesh substrate in a mesh-sheet form and a flexible thin-film adhesive substrate attached to said mesh substrate.

4. The mat according to claim 3,
   wherein said mesh substrate comprises a mesh tape and said adhesive substrate comprises an adhesive bandage.

5. The mat according to claim 1, wherein said constituent medium comprises a case member formed of a flexible pile weave fabric, wherein said grain pieces are arranged in a single layer and are each located in each of the meshes of a meshed ground structure of said pile weave fabric thereby locked in said case member by means of each pile portion.

6. The mat according to claim 5,
   wherein said case member comprises a pile weave towel cloth.

7. An acoustic equipment vibration dissipating silica-gel grain mat consisting of:
   a plurality of silica-gel grain pieces; and
   a flexible thin-film support substrate comprising first and second side surfaces, said silica-gel grain pieces being attached to each of said first and second side surfaces and arranged in a single layer thereon, said silica-gel grain pieces forming respective direct contact surfaces for acoustic equipment and an acoustic equipment support surface.

8. The mat according to claim 7,
   wherein said support substrate comprises a double-sided tape.

9. The mat according to claim 8,
   wherein said double-sided tape has a mesh configuration.

10. The mat according to any one of claim 1 to 9,
    wherein said silica-gel grain pieces are coated with a carbon coat.

11. The mat according to any one of claim 1 to 9,
    wherein said grain pieces substantially have spherical shapes having diameters in the range of 1 mm to 10 mm.

12. The mat according to any one of claim 1 to 9,
    wherein said grain pieces comprise B-type silica gel.

13. The mat according to claim 10,
    wherein said grain pieces substantially have spherical shapes having diameters in the range of 1 mm to 10 mm.

14. The mat according to claim 10,
    wherein said grain pieces comprise B-type silica gel.

15. The mat according to claim 11,
    wherein said grain pieces comprise B-type silica gel.

* * * * *